(12) United States Patent
Bok et al.

(10) Patent No.: US 12,547,288 B2
(45) Date of Patent: Feb. 10, 2026

(54) DISPLAY DEVICE

(71) Applicant: Samsung Display Co., Ltd., Yongin-Si (KR)

(72) Inventors: Seunglyong Bok, Yongin-si (KR); Kicheol Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/789,749

(22) Filed: Jul. 31, 2024

(65) Prior Publication Data

US 2025/0077018 A1    Mar. 6, 2025

(30) Foreign Application Priority Data

Sep. 1, 2023   (KR) .................. 10-2023-0116272

(51) Int. Cl.
*G06F 3/044* (2006.01)
*G06F 3/041* (2006.01)
*H10K 59/40* (2023.01)

(52) U.S. Cl.
CPC .......... *G06F 3/0448* (2019.05); *G06F 3/0412* (2013.01); *G06F 3/04164* (2019.05); *G06F 3/0443* (2019.05); *G06F 3/0446* (2019.05); *H10K 59/40* (2023.02); *G06F 3/0445* (2019.05); *G06F 2203/04111* (2013.01); *G09G 2354/00* (2013.01)

(58) Field of Classification Search
CPC .. G06F 3/0412; G06F 3/04164; G06F 3/0443; G06F 3/0445; G06F 3/0446; G06F 3/0448; G06F 2203/04111; G09G 3/3233; G09G 2300/0819; G09G 2300/0842; G09G 2300/0861; G09G 2354/00; H10K 59/40

See application file for complete search history.

(56) References Cited

U.S. PATENT DOCUMENTS

| | | | |
|---|---|---|---|
| 10,055,069 B2 * | 8/2018 | Lee ................... | G02F 1/133514 |
| 10,644,083 B2 | 5/2020 | Lee et al. | |
| 10,852,897 B2 | 12/2020 | Lee et al. | |
| 10,890,997 B2 | 1/2021 | Kim et al. | |
| 10,915,213 B2 | 2/2021 | Ko et al. | |
| 11,094,772 B2 | 8/2021 | Ma et al. | |
| 11,556,216 B2 | 1/2023 | Blondin et al. | |
| 2009/0256821 A1 * | 10/2009 | Mamba ................. | G06F 3/0446 |
| | | | 345/174 |

(Continued)

FOREIGN PATENT DOCUMENTS

| | | |
|---|---|---|
| CN | 110379356 A | 10/2019 |
| CN | 110658952 A | 1/2020 |

(Continued)

*Primary Examiner* — Julie Anne Watko
(74) *Attorney, Agent, or Firm* — Innovation Counsel LLP

(57) ABSTRACT

The present disclosure relates to a display device including a first sensor electrode row including a plurality of first sensor electrodes and extending in a first direction in a sensing area and a second sensor electrode row extending in a second direction in the sensing area, wherein a width of the second sensor electrode row in the first direction is not constant, a first edge of the second sensor electrode row comprises a first boundary line and a second boundary line, and each of the first boundary line and the second boundary line crosses the first sensor electrode row.

19 Claims, 15 Drawing Sheets

(56) References Cited

U.S. PATENT DOCUMENTS

| | | | | |
|---|---|---|---|---|
| 2010/0013745 A1* | 1/2010 | Kim | ................... | H10K 59/40 345/76 |
| 2010/0302201 A1* | 12/2010 | Ritter | .................. | G06F 3/0446 345/174 |
| 2013/0207924 A1* | 8/2013 | Mohindra | ............ | G06F 3/0443 345/174 |
| 2023/0025817 A1 | 1/2023 | Choi et al. | | |

FOREIGN PATENT DOCUMENTS

| KR | 10-2017-0134836 A | 12/2017 |
|---|---|---|
| KR | 10-2019-0016635 A | 2/2019 |
| KR | 10-2020-0044264 A | 4/2020 |
| KR | 10-2020-0061053 A | 6/2020 |
| KR | 10-2336971 B1 | 12/2021 |
| KR | 10-2023-0016732 A | 2/2023 |

* cited by examiner

DISPLAY DEVICE

CROSS-REFERENCE TO RELATED APPLICATION

This application is based on and claims priority under 35 U.S.C. § 119 to Korean Patent Application No. 10-2023-0116272, filed on Sep. 1, 2023, in the Korean Intellectual Property Office, the disclosure of which is incorporated by reference herein in its entirety.

BACKGROUND

1. Field

The disclosure relates to a display device.

2. Description of the Related Art

A display device visually displays data. The display device may be used as a display of a small product such as a mobile phone or as a display of a large product such as a television.

The display device may include a liquid crystal display device including a display element that does not emit light and using backlight as light source or a light-emitting display device including a display element that emits light. The display element may include an emission layer.

SUMMARY

One or more embodiments relate to a display device having improved reliability and display quality. However, the one or more embodiments are only examples, and the scope of the disclosure is not limited thereto.

Additional aspects will be set forth in part in the description which follows and, in part, will be apparent from the description, or may be learned by practice of the presented embodiments of the disclosure.

According to one or more embodiments, a display device includes a first sensor electrode row including a plurality of first sensor electrodes and extending in a first direction in a sensing area, and a second sensor electrode row extending in a second direction and arranged in the sensing area, wherein a width of the second sensor electrode row in the first direction is not constant.

According to one or more embodiments, the first sensor electrodes disposed adjacent to each other may be connected to each other through a bridge line.

According to one or more embodiments, the second sensor electrode row may include a first portion and a second portion disposed closer to a pad unit than the first portion.

According to one or more embodiments, a portion of a channel line connecting the first portion to a pad may cross the bridge line and may be arranged in a different layer from the bridge line.

According to one or more embodiments, the first portion and the second portion may be connected to a same pad arranged in the pad unit.

According to one or more embodiments, the first portion and the second portion may be respectively connected to different pads arranged in the pad unit.

According to one or more embodiments, the second sensor electrode row arranged between adjacent first sensor electrode rows may include a first portion and a second portion, and a width of the first portion in the first direction may be greater than a width of the second portion in the first direction.

According to one or more embodiments, the second sensor electrode row may include a third portion and a fourth portion, and each of the third portion and the fourth portion may be disposed in an area corresponding to one or two adjacent first sensor electrode rows.

According to one or more embodiments, a width of the third portion in the first direction may constantly increase toward a driving unit.

According to one or more embodiments, a width of the fourth portion in the first direction may constantly reduce toward the driving unit.

According to one or more embodiments, the third portion and the fourth portion may be alternately arranged in the second direction, and the second sensor electrode row may include a plurality of third portions and a plurality of fourth portions arranged alternately.

According to one or more embodiments, the second sensor electrode row may include a first portion and a second portion disposed closer to a pad unit than the first portion, and each of the first portion and the second portion may include the third portion and the fourth portion arranged alternately.

According to one or more embodiments, a display device includes a first sensor electrode row including a plurality of first sensor electrodes and extending in a first direction in a sensing area, and a second sensor electrode row extending in a second direction in the sensing area, wherein a first edge of the second sensor electrode row comprises a first boundary line and a second boundary line, and the first boundary line is a diagonal line having a positive inclination and the second boundary line is a diagonal line having a negative inclination.

According to one or more embodiments, each of the first boundary line and the second boundary line may cross at least one first sensor electrode rows.

According to one or more embodiments, the first boundary line and the second boundary line may be arranged in the second direction, and the first edge of the second sensor electrode row may include a plurality of first boundary lines and a plurality of second boundary lines arranged alternately.

According to one or more embodiments, the second sensor electrode row may include a first portion and a second portion disposed closer to a driving unit than the first portion, and the first edge of the first portion and the second portion may include the first boundary line and the second boundary line arranged alternately.

According to one or more embodiments, a second edge of the second sensor electrode row may be a straight line.

According to one or more embodiments, the second sensor electrode row may include a first portion and a second portion disposed closer to a driving unit than the first portion, and each of the first portion and the second portion may include the first edge including the first boundary line and the second boundary line and the second edge provided in a straight line.

According to one or more embodiments, a display device includes a first sensor electrode row including a plurality of first sensor electrodes and extending in a first direction in a sensing area, and a second sensor electrode row extending in a second direction and arranged in the sensing area, wherein a first edge of the second sensor electrode row is a diagonal line having a positive inclination, and a second edge of the second sensor electrode row is a diagonal line having a negative inclination.

According to one or more embodiments, a display device includes a first sensor electrode row including a plurality of first sensor electrodes and extending in a first direction in a sensing area, and a second sensor electrode row extending in a second direction and arranged in the sensing area, wherein a first edge of the second sensor electrode row is a diagonal line having a positive or negative inclination, and a second edge of the second sensor electrode row is a straight line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
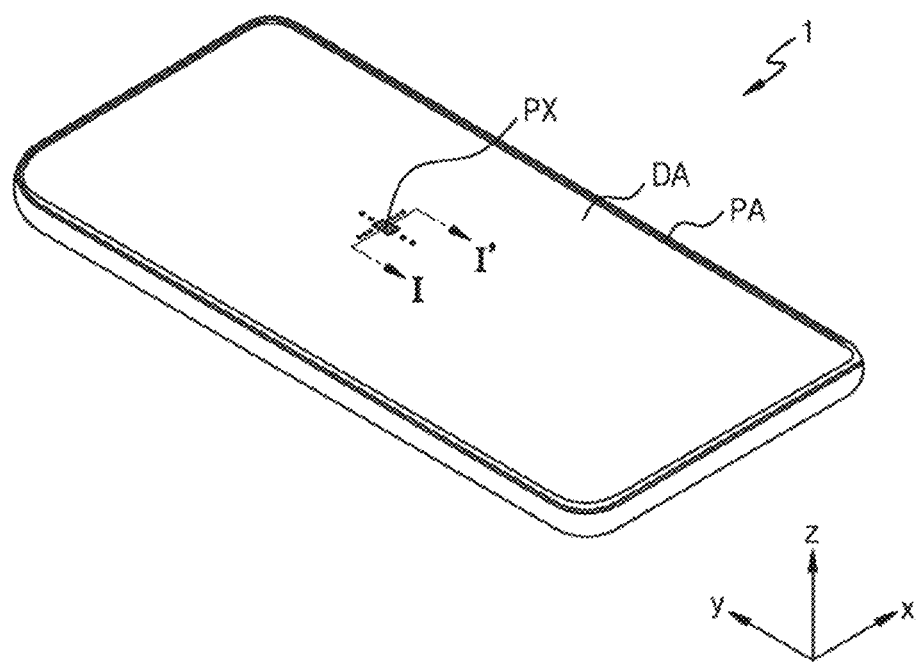
FIG. 1 schematically shows a perspective view of a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof.

Because the disclosure may have diverse modified embodiments, preferred embodiments are illustrated in the drawings and are described in the detailed description. An effect and a characteristic of the disclosure, and a method of accomplishing these will be apparent when referring to embodiments described with reference to the drawings. The disclosure may, however, be embodied in many different forms and should not be construed as limited to the embodiments set forth herein.

One or more embodiments of the disclosure will be described below in more detail with reference to the accompanying drawings. Those elements that are the same or are in correspondence are rendered the same reference numeral regardless of the figure number, and redundant descriptions thereof are omitted.

In the embodiments below, the terms "first" and "second" are not used in a limited sense and are used to distinguish one component from another component.

As used herein, the singular expressions "a," "an," and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

It will be understood that when a layer, region, or element is referred to as being formed "on" another layer, area, or element, it can be directly or indirectly formed on the other layer, region, or element. That is, for example, intervening layers, regions, or elements may be present.

In the drawings, for convenience of description, sizes of components may be exaggerated or reduced. In other words, since sizes and thicknesses of elements in the drawings are arbitrarily illustrated for convenience of description, the following embodiments are not limited thereto.

When a certain embodiment may be implemented differently, a specific process order may be performed differently from the described order. For example, two consecutively described processes may be performed substantially at the same time or performed in an order opposite to the described order.

In the specification, "A and/or B" denotes only A, only B, or both A and B. Also, "at least one of A and B" denotes only A, only B, or both A and B.

In the embodiments hereinafter, it will be understood that when an element, an area, or a layer is referred to as being connected to another element, area, or layer, it can be directly and/or indirectly connected to the other element, area, or layer. For example, in the specification, when a layer, region, component, or the like is electrically connected to another layer, region, component, or the like, the layer, region, component, or the like may be directly electrically connected thereto and/or may be indirectly electrically connected thereto with an intervening layer, region, component, or the like therebetween.

In the following examples, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

FIG. 1 schematically shows a perspective view of a display device according to an embodiment.

The display device according to embodiments may display a moving image or a still image, and may be used as displays of various products such as portable electronic devices such as a mobile phone, a smart phone, a tablet personal computer (PC), a mobile communication device, an electronic notepad, an electronic book, a portable multimedia player (PMP), a navigation device, and an ultramobile PC (UMPC), and a television, a notebook computer, a monitor, a billboard, and internet of things (IOT). Furthermore, the display device according to one embodiment may be used in a wearable device such as a smart Watch, a watch phone, an eyewear display, and a head mounted display (HMD). In addition, the display device according to an embodiment may be used as a dashboard of a vehicle, center information display (CID) arranged in a center fascia or dashboard of a vehicle, a room mirror display replacing the side mirror of a vehicle, an entertainment device for the back seat of a vehicle, and a display arranged on the rear surface of the front seat.

Referring to FIG. 1, the display device 1 may have edges extending in a first direction and edges extending in a second direction. The first direction and the second direction may intersect each other. For example, the first direction and the second direction may form an acute angle. In another example, the first direction and the second direction may form an obtuse angle or a right angle. Hereinafter, descriptions will mainly be made regarding cases in which the first direction and the second direction intersect each other. For example, the first direction may be an x or −x direction, and the second direction may be a y or −y direction. The third direction perpendicular to the first and second directions may be a z or −z direction.

The display device 1 may include a display area DA and a peripheral area PA outside of the display region DA. The display device 1 may provide a certain image by using light emitted from a plurality of subpixels arranged in the display area DA. The peripheral area PA is an area disposed outside of the display area DA and may be a non-display area in which subpixels are not arranged. The entire display area DA may be surrounded by the peripheral area PA.

Hereinafter, although an organic light-emitting display device is described as a display device according to an embodiment, the display device of the disclosure is not limited thereto. In an embodiment, the display device of the disclosure may be an inorganic light-emitting display or an inorganic EL display, or a quantum dot light-emitting display. For example, the emission layer of the display element included in the display device may include organic material or inorganic material. Furthermore, the display device may include an emission layer and quantum dots located on a path of light emitted from the emission layer.

Figure 2:
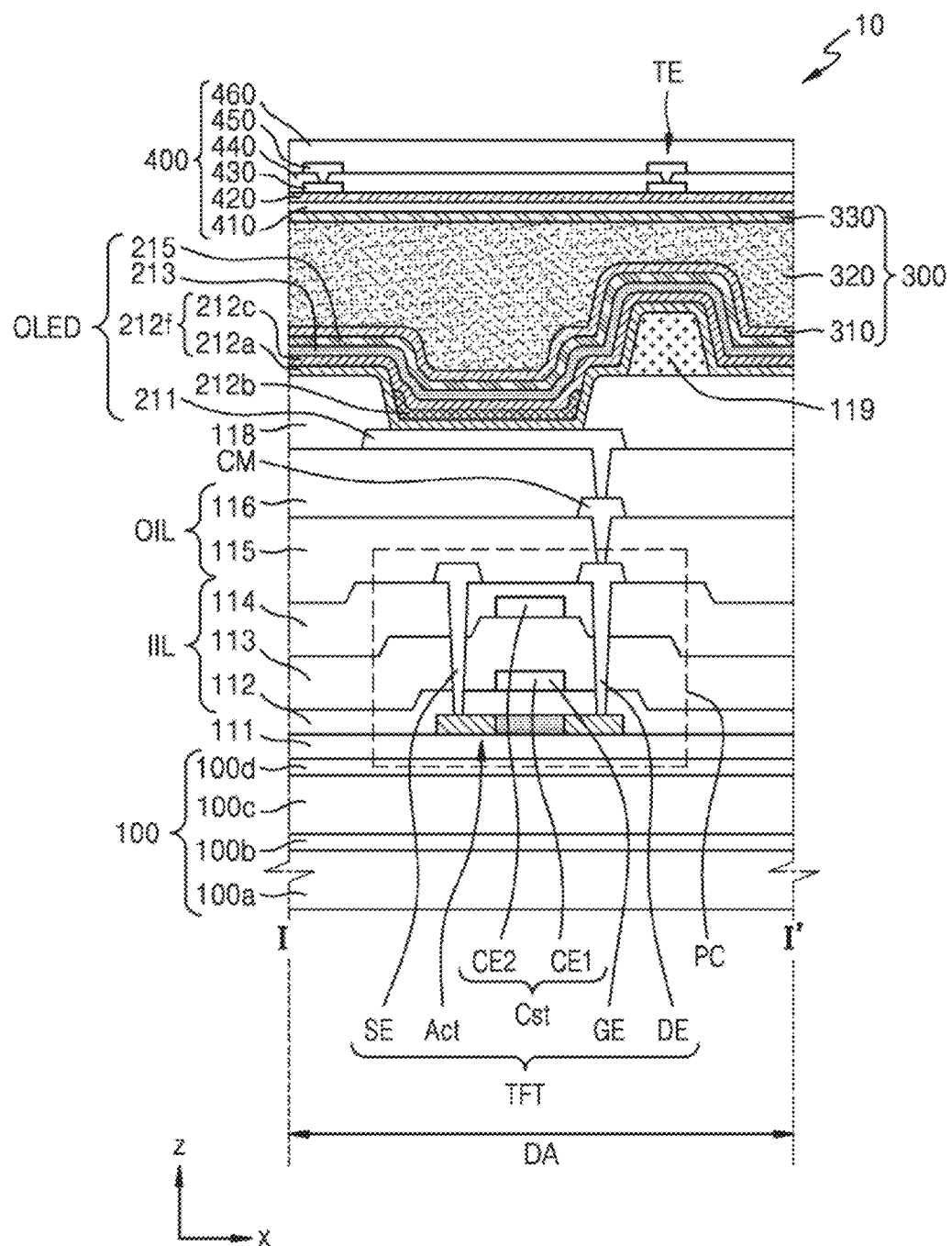
FIG. 2 schematically shows a cross-sectional view of a display panel according to an embodiment.

FIG. 2 schematically shows a cross-sectional view of a display panel according to an embodiment. Specifically, FIG. 2 schematically shows a cross-sectional view of the display area of the display device according to an embodiment.

Referring to FIG. 2, the display panel 10 may include a substrate 100, an inorganic insulating layer IIL, an organic insulating layer OIL, a subpixel circuit PC, a connection electrode CM, an organic light-emitting diode OLED, a pixel defining layer 118, a spacer 119, and an encapsulation layer 300. That is, the substrate 100, the inorganic insulating layer IIL, the organic insulating layer OIL, the subpixel circuit PC, the connection electrode CM, the organic light-emitting diode OLED, the pixel defining layer 118, the spacer 119, and the encapsulation layer 300 may be arranged in the display area DA.

The substrate 100 may include a first base layer 100a, a first barrier layer 100b, a second base layer 100c, and a second barrier layer 100d. In an embodiment, the first base layer 100a, the first barrier layer 100b, the second base layer 100c, and the second barrier layer 100d may be sequentially stacked in the thickness direction of the substrate 100.

At least one of the first base layer 100a and the second base layer 100c may include a polymer resin such as polyethersulfone, polyarylate, polyetherimide, polyethylene naphthalate, polyethylene terephthalate, polyphenylene sulfide, polyimide, polycarbonate, cellulose tri acetate, cellulose acetate propionate, etc.

The first barrier layer 100b and the second barrier layer 100d may prevent the penetration of foreign substances from outside to a semiconductor layer Act and may have a single-layer or multi-layer structure including silicon nitride ($SiN_x$), silicon oxide ($SiO_2$), and/or silicone oxynitride (SiON).

A buffer layer 111 may be disposed on the substrate 100. The buffer layer 111 may include inorganic insulating materials such as $SiN_x$, SiON, and $SiO_2$ and may have a single-layer or multi-layer structure including the inorganic insulators described above.

The inorganic insulation layer IIL may be disposed on the buffer layer 111. The inorganic insulating layer IIL may include a first inorganic insulating layer 112, a second inorganic insulating layer 113, and a third inorganic insulating layer 114.

A subpixel circuit PC may be arranged in the display area DA. The subpixel circuit PC may include a thin-film transistor TFT and a storage capacitor Cst. The thin-film transistor TFT may include a semiconductor layer Act, a gate electrode GE, a source electrode SE, and a drain electrode DE.

The semiconductor layer Act may be disposed on the buffer layer 111. The semiconductor layer Act may include polysilicon. Alternatively, the semiconductor layer Act may include amorphous silicon, an oxide semiconductor, or an organic semiconductor. The semiconductor layer Act may include a channel area and a drain area and a source area respectively arranged on both sides of the channel area.

The gate electrode GE may be disposed on the semiconductor layer Act. The gate electrode GE may overlap the channel area. The gate electrode GE may include a low-resistance metal material. The gate electrode GE may include a conductive material including molybdenum (Mo), aluminum (Al), copper (Cu), titanium (Ti), etc. and may have a single-layer structure or multi-layer structure including the conductive materials described above.

The first inorganic insulating layer 112 may be arranged between the semiconductor layer Act and the gate electrode GE. The first inorganic insulating layer 112 may include an inorganic insulating material such as $SiO_2$, $SiN_x$, SiON, aluminum oxide ($Al_2O_3$), titanium oxide ($TiO_2$), tantalum oxide ($Ta_2O_5$), hafnium oxide ($HfO_2$), or zinc oxide (ZnO).

The second inorganic insulating layer 113 may be disposed on the gate electrode GE. The second inorganic insulating layer 113 may cover the gate electrode GE. The second inorganic insulating layer 113 may include an inorganic insulating material such as $SiO_2$, $SiN_x$, SiON, $Al_2O_3$, $TiO_2$, $Ta_2O_5$, $HfO_2$, or ZnO.

An upper electrode CE2 of the storage capacitor Cst may be disposed on the second inorganic insulating layer 113. The upper electrode CE2 may overlap the gate electrode GE arranged below the upper electrode CE2. In this case, the gate electrode GE and the upper electrode CE2 overlapping each other with the second inorganic insulating layer 113 disposed therebetween may form the storage capacitor Cst. That is, the gate electrode GE may function as a lower electrode CE1 of the storage capacitor Cst.

As described above, the storage capacitor Cst may overlap the thin-film transistor TFT. However, the disclosure is not limited thereto. For example, the storage capacitor Cst may not overlap the thin-film transistor TFT. That is, the lower electrode CE1 of the storage capacitor Cst, which is a separate component from the gate electrode GE of the thin-film transistor TFT, may be disposed to be spaced apart from the gate electrode GE of the thin-film transistor TFT.

The upper electrode CE2 may include aluminum (Al), platinum (Pt), palladium (Pd), silver Ag, magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may have a single-layer structure or multi-layer structure including the materials described above.

The third inorganic insulating layer 114 may be disposed on the upper electrode CE2. The third inorganic insulating layer 114 may cover an upper electrode CE2. The third inorganic insulating layer 114 may include an inorganic insulating material such as $SiO_2$, $SiN_x$, SiON, $Al_2O_3$, $TiO_2$, $Ta_2O_5$, $HfO_2$, or ZnO. The third inorganic insulating layer 114 may have a single-layer structure or multi-layer structure including the inorganic insulating material described above. The drain electrode DE and the source electrode SE may each be disposed on the third inorganic insulating layer 114. The drain electrode DE and the source electrode SE may each be connected to the semiconductor layer Act through a contact hole included in the first inorganic insulating layer 112, the second inorganic insulating layer 113, and the third inorganic insulating layer 114. The drain electrode DE and the source electrode SE may include materials with great conductivity. The drain electrode DE and the source electrode SE may include conductive materials including Mo, Al, Cu, Ti, etc. and have a single-layer structure or multi-layer structure including the materials described above. For example, the drain electrode DE and the source electrode SE may have a multi-layer structure of Ti/Al/Ti.

Figure 6:
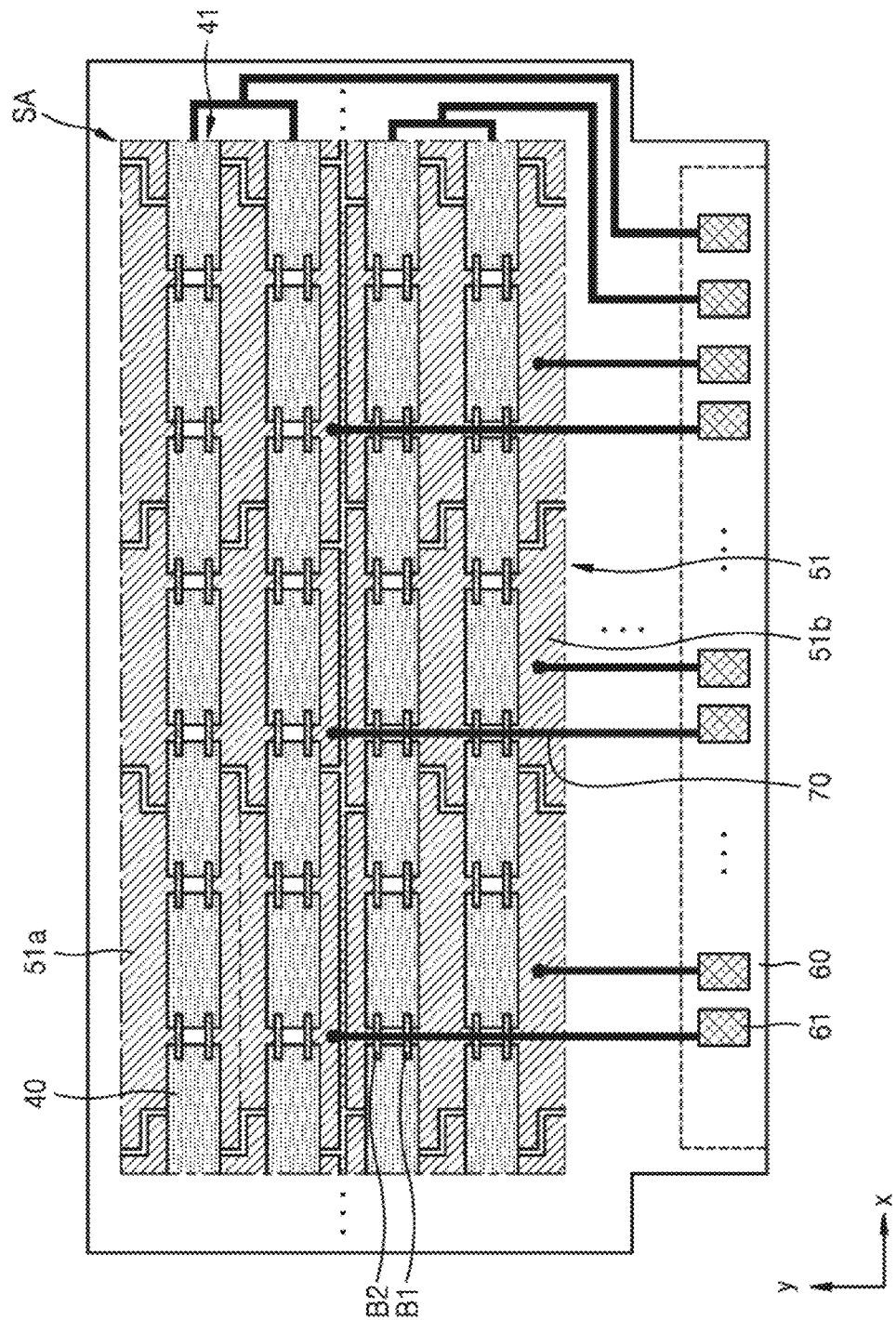

The organic insulating layer OIL may be disposed on the inorganic insulating layer IIL. The organic insulating layer OIL may include a first organic insulating layer 115 and a second organic insulating layer 116. FIG. 6 shows two organic insulating layers OIL, but the disclosure is not limited thereto. The number of organic insulating layers OIL may be three or four. The first organic insulating layer 115 may cover the drain electrode DE and the source electrode SE. The first organic insulating layer 115 may include an organic insulating material, such as a general-purpose polymer, such as polymethylmethacrylate (PMMA) or polystyrene (PS), polymer derivatives having a phenol-based group, acryl-based polymers, imide-based polymers, arylether-based polymers, amide-based polymers, fluorine-based polymers, p-xylene-based polymers, vinyl alcohol-based polymers, and a blend thereof.

The connection electrode CM may be disposed on the first organic insulating layer 115. In this case, the connection electrode CM may be connected to the drain electrode DE or the source electrode SE through a contact hole formed through the first organic insulating layer 115. The connection electrode CM may include a material with good conduction. The connection electrode CM may include a conductive material including Mo, Al, Cu, Ti, etc. and may have a single-layer structure or multi-layer structure including the conductive materials described above. For example, the connection electrode CM may have a multi-layer structure of Ti/Al/Ti.

A second organic insulating layer 116 may be disposed on the connection electrode CM. The second organic insulating layer 116 may cover the connection electrode CM. The second organic insulating layer 116 may include a material that is identical to or different from the first organic insulating layer 115.

A light-emitting diode may be disposed on the second organic insulating layer 116. For example, an organic light-emitting diode OLED may be disposed on the second organic insulating layer 116. Alternatively, although not shown, an inorganic light-emitting diode may be disposed on the second organic insulating layer 116.

The organic light-emitting diode OLED may emit red, green, or blue light, or may emit red, green, blue, or white light. The organic light-emitting diode OLED may include a subpixel electrode 211, an emission layer 212b, a functional layer 212f, an opposite electrode 213, and a capping layer 215.

The subpixel electrode 210 may be disposed on the second organic insulating layer 116. The subpixel electrode 211 may be electrically connected to the connection electrode CM through a contact hole formed through the second organic insulating layer 116. The subpixel electrode 221 may include a conductive oxide, such as indium tin oxide (ITO), indium zinc oxide (IZO), zinc oxide (ZnO), indium oxide ($In_2O_3$), indium gallium oxide (IGO), or aluminum zinc oxide (AZO). According to an embodiment, the subpixel electrode 211 may include a reflective layer including Ag, Mg, Al, Pt, Pd, Au, Ni, Nd, Ir, Cr, or a compound thereof. In an embodiment, the subpixel electrode 211 may further include a layer including ITO, IZO, ZnO or $In_2O_3$ above/below the reflective layer described above. For example, the subpixel electrode 211 may have a multi-layer structure of an ITO/Ag/ITO.

A pixel defining layer 118 including an opening that exposes at least a portion of the subpixel electrode 211 may be disposed on the subpixel electrode 211. The emission area of light emitted from the organic light-emitting diode OLED may be defined by the opening defined in the pixel defining layer 118. For example, the width of the opening may correspond to the width of the emission area.

The pixel defining layer 118 may include an organic insulating material. The pixel defining layer 201 may include an inorganic insulating material, such as $SiN_x$, SiON, or $SiO_2$. Alternatively, the pixel defining layer 118 may include an organic insulating material and an inorganic insulating material. In an embodiment, the pixel defining layer 118 may include a light blocking material. The light blocking material may include a resin or paste including carbon black, carbon nanotube, or black dyes, metal particles such as Ni, Al, Mo, and an alloy thereof, metal oxide particles (for example, chrome oxide), or metal nitride particles (for example, chrome nitride). When the pixel defining layer 118 includes a light blocking material, external light reflected by metal structures disposed under the pixel defining layer 118 may be reduced.

The spacer 119 may be disposed on the pixel defining layer 118. The spacer 119 may include an organic insulating material, such as polyimide. Alternatively, the spacer 119 may include an inorganic insulating material such as $SiN_x$ or $SiO_2$ or may include an organic insulating material and an inorganic insulating material.

In an embodiment, the spacer 119 may include the same material as the pixel defining layer 118. For example, the pixel defining layer 118 and the spacer 217 may be formed together by a mask process using a halftone mask, etc. Alternatively, the spacer 119 and the pixel defining layer 118 may include different materials.

The emission layer 212b may be disposed on the opening of the pixel defining layer 118. The emission layer 212b may include a high molecular-weight or low molecular-weight organic material emitting a predetermined color of light.

The functional layer 212f may include a first functional layer 212a and a second functional layer 212c. The first functional layer 212a may be arranged between the subpixel electrode 211 and the emission layer 212b, and the second functional layer 212c may be arranged between the emission layer 212b and the opposite electrode 213. However, at least one of the first functional layer 212a and the second functional layer 212c may be omitted. Hereinafter, an organic light-emitting diode OLED which includes the first functional layer 212a and the second functional layer 212c will be described in detail.

The first functional layer 212a may include a hole transport layer (HTL) and/or a hole injection layer (HIL). The second functional layer 212c may include an electron transport layer (ETL) and/or an electron injection layer (EIL). The first functional layer 212a and/or the second functional layer 212c may be a common layer formed to cover the entire substrate 100 in the same manner as the opposite electrode 213 described later.

The opposite electrode 213 may be disposed on the second functional layer 212c. The opposite electrode 213 may include a conductive material having a low work function. For example, the opposite electrode 223 may include a transparent (or transflective) layer including Ag, Mg, Al, Pt, Pd, Au, Ni, Nd, Ir, Cr, Li, Ca, or an alloy thereof. Alternatively, the opposite electrode 213 may further include a layer, such as ITO, IZO, ZnO, or $In_2O_3$, on the transparent (or transflective) layer including the material described above.

In an embodiment, the capping layer 215 may be disposed on the opposite electrode 213. The capping layer 215 may include LiF, an inorganic material, or/and an organic material.

The encapsulation layer 300 may be disposed on the organic light-emitting diode OLED. The encapsulation layer 300 may cover the organic light-emitting diode OLED. The encapsulation layer 300 may be disposed on the opposite electrode 213 and/or the capping layer 215. In an embodiment, the thin-film encapsulation layer 300 may include at least one inorganic film layer and at least one organic film layer. FIG. 6 shows that the encapsulation layer 300 includes a first inorganic encapsulation layer 310, an organic encapsulation layer 320, and a second inorganic encapsulation layer 330 that are sequentially stacked.

The first inorganic encapsulation layer 310 and the second inorganic encapsulation layer 330 may each include one or more inorganic materials of $Al_2O_3$, $TiO_2$, $Ta_2O_5$, $HfO_2$, $ZrO_2$, $SiO_2$, $SiN_x$, and SiON. The first inorganic encapsulation layer 310 and the second inorganic encapsulation layer 330 may have a single-layer or multi-layer structure including a material described above. The organic encapsulation layer 320 may include a polymer-based material. Examples of the polymer-based material may include an acrylic resin, an epoxy resin, polyimide, and polyethylene. In an embodiment, the organic encapsulation layer 320 may include acrylate.

A touch sensor layer 400 may be disposed on the encapsulation layer 300. The touch sensor layer 400 may include a first touch insulating layer 410, a second touch insulating layer 420, a first conductive layer 430, a third touch insulating layer 440, the second conductive layer 450, and a planarization layer 460.

In an embodiment, the first touch insulating layer 420 may be disposed on the second inorganic encapsulation layer 330, and the second touch insulating layer 420 may be disposed on the first touch insulating layer 410. In an embodiment, the first touch insulating layer 410 and the second touch insulating layer 420 may include an inorganic insulating material and/or an organic insulating material. For example, the first touch insulating layer 410 and the second touch insulating layer 420 may include inorganic insulating materials such as $SiO_2$, $SiN_x$, and/or SiON.

In an embodiment, at least one of the first touch insulating layer 410 and the second touch insulating layer 420 may be omitted. For example, the first touch insulating layer 410 may be omitted. In this case, the second touch insulating layer 420 may be disposed on the second inorganic encapsulation layer 330, and the first conductive layer 430 may be disposed on the second touch insulating layer 420.

The first conductive layer 430 may be disposed on the second touch insulating layer 420, and the third touch insulating layer 440 may be disposed on the first conductive layer 430. In an embodiment, the third touch insulating layer 440 may include an inorganic insulating material and/or an organic insulating material. For example, the third touch insulating layer 440 may include inorganic insulating materials such as $SiO_2$, $SiN_x$, and/or SiON.

The second conductive layer 450 may be disposed on the third touch insulating layer 440. A touch electrode TE of the touch sensor layer 400 may have a structure in which the first conductive layer 430 and the second conductive layer 450 are connected with each other. Alternatively, the touch electrode TE may be formed in any one of the first conductive layer 430 and the second conductive layer 450, and may include a metal line included in the corresponding conductive layer. The first conductive layer 430 and the second conductive layer 450 may each include at least one of Al, Cu, Ti, MO, and ITO, and may have a single-layer structure or multi-layer structure including the materials described above. For example, the first conductive layer 430 and the second conductive layer 450 may each have a three-layer structure of Ti/Al/Ti.

In an embodiment, the planarization layer 460 may cover the second conductive layer 450. The planarization layer 460 may include an organic insulating material.

Figure 3:
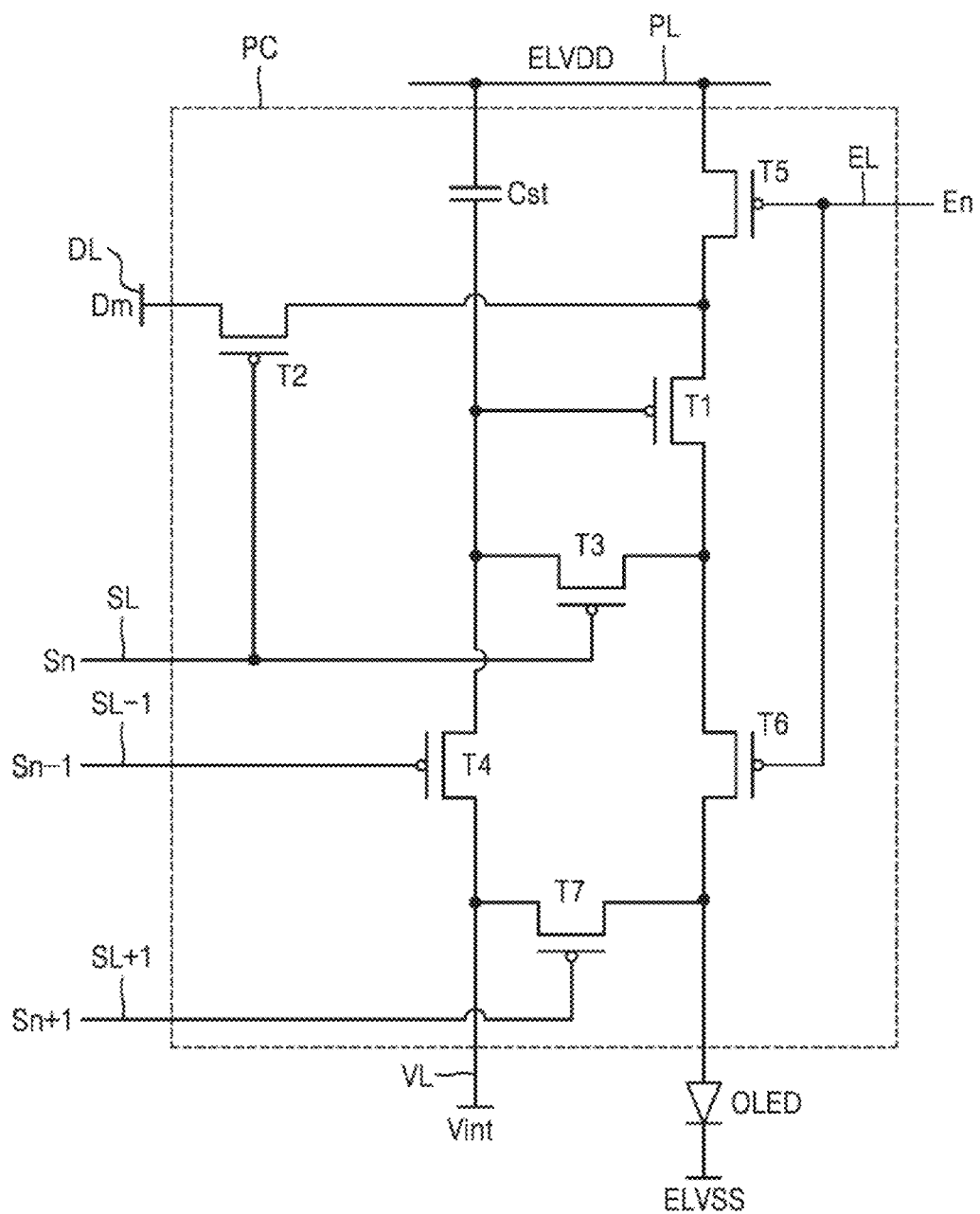
FIG. 3 is an equivalent circuit diagram schematically illustrating a subpixel circuit electrically connected to a subpixel according to an embodiment.

FIG. 3 is an equivalent circuit diagram schematically illustrating a subpixel circuit electrically connected to a subpixel according to an embodiment.

Referring to FIG. 3, the subpixel may emit light through the organic light-emitting diode, and the organic light-emitting diode may be electrically connected to the subpixel circuit.

The subpixel circuit PC may include a first transistor T1, a second transistor T2, a third transistor T3, a fourth transistor T4, a fifth transistor T5, a sixth transistor T6, a seventh transistor 7, and a storage capacitor Cst.

The first transistor Tl may be a driving thin-film transistor, may be connected to a driving voltage line PL and the storage capacitor Cst, and may be configured to control a driving current flowing from the driving voltage line PL through the organic light-emitting diode OLED according to a value of the voltage stored in the storage capacitor Cst. The organic light-emitting diode OLED may emit light having a certain brightness according to the driving current. A second electrode (for example, a cathode) of the organic light-emitting diode OLED may receive a common voltage ELVSS.

The second transistor T2 may be a switching thin-film transistor, may be connected to a signal line SL and a data line DL, and may transmit a data voltage (or a data signal Dm) input from the data line DL to the first transistor T1 in response to a scan signal input from the signal line SL (or a scan voltage, a switching voltage, or a switching signal Sn).

The storage capacitor Cst may be connected to the driving voltage line PL and the first transistor T1. An electrode of the storage capacitor Cst may be connected to the driving voltage line PL, and another electrode of the storage capacitor Cst may be connected to a gate of the first transistor T1. The storage capacitor Cst may store a voltage difference between the first driving voltage ELVDD and a gate voltage of the first transistor T1, and may maintain the gate voltage of the first transistor T1.

The third transistor T3 may be a compensation thin-film transistor, and the gate electrode of the third transistor T3 may be connected to the signal line SL. The source electrode of the third transistor T3 may be connected to the drain electrode of the first transistor T1 and may be connected to a first electrode (for example, the anode) of the organic light-emitting diode OLED via the sixth transistor T6. The drain electrode of the third transistor T3 may be connected to the another electrode of the storage capacitor Cst, a source electrode of the fourth transistor T4, and the gate of the first transistor T1. The third transistor T3 is turned on according to a scan signal Sn received through the signal line SL to connect the gate electrode and the drain electrode of the first transistor T1 to each other such that the first transistor T1 is diode-connected.

The fourth transistor T4 may be an initialization thin-film transistor, and the gate of the fourth transistor T4 may be connected to a previous signal line SL-1. The drain electrode of the fourth transistor T4 may be connected to an initialization voltage line VL. The source electrode of the fourth transistor T4 may be connected to the another electrode of the storage capacitor Cst, the drain electrode of the fourth transistor T3, and the gate of the first transistor T1. The fourth transistor T4 may be turned on in response to the previous scan signal Sn-1 received through the previous scan line SL-1 and perform an initialization operation of transmitting an initialization voltage Vint to the gate of the first transistor T1 to initialize the voltage of the gate of the first transistor T1.

The fifth transistor T5 may be an operation control thin-film transistor, and a gate of the fifth transistor T5 may be connected to the emission control line EL. A source electrode of the fifth transistor T5 may be connected to the driving voltage line PL. The drain electrode of the fifth transistor T5 may be connected to the source electrode of the first transistor T1 and the drain electrode of the second transistor T2.

The sixth transistor T6 may be an emission control thin-film transistor, and the gate electrode may be connected to the emission control line EL. A source electrode of the sixth transistor T6 may be connected to the drain electrode of the first transistor T1 and the source electrode of the third transistor T3. A drain electrode of the sixth transistor T6 may be electrically connected to the first electrode of the organic light-emitting diode OLED. The fifth transistor T5 and the sixth transistor T6 may be simultaneously turned on in response to the emission control signal En received through the emission control line EL, so that the driving voltage ELVDD is applied to the organic light-emitting diode OLED and a driving current flows through the organic light-emitting diode OLED.

The seventh transistor T7 may be an initialization thin-film transistor initializing the first electrode of the organic light-emitting diode OLED. A gate of the seventh transistor T7 may be connected to a next signal line SL+1. A source electrode of the seventh transistor T7 may be connected to the first electrode of the organic light-emitting diode OLED. A drain electrode of the seventh transistor T7 may be connected to the initialization voltage line VL. The seventh transistor T7 may be turned on in response to a next scan signal Sn+1 received through the next scan line SL+1, so that the first electrode of the organic light-emitting diode OLED is initialized.

Although FIG. 3 illustrates that the fourth transistor T4 and the seventh transistor T7 are connected to the previous scan line SL-1 and the next scan line SL+1, respectively, the fourth transistor T4 and the seventh transistor T7 may both be connected to the previous scan line SL-1 to be driven in response to the previous scan signal Sn-1.

An electrode of the storage capacitor Cst can be connected to the driving voltage line PL. Another electrode of the storage capacitor Cst may be connected to the gate of the first transistor T1, the drain electrode of the third transistor T3, and the source electrode of the fourth transistor T4.

The second electrode of the organic light-emitting diode OLED may receive a common voltage ELVSS. The organic light-emitting diode OLED may emit light according to a driving current supplied from the first transistor T1.

In an embodiment, the plurality of transistors T1 to t7 may include a semiconductor layer including silicon. However, the disclosure is not limited thereto.

In an embodiment, at least one of the plurality of transistors T1 to T7 may include a semiconductor layer including oxide, and the remaining transistors may include a semiconductor layer including silicon. Particularly, the first transistor T1, which directly affects the brightness of the display panel 10, may include a silicon semiconductor including a polycrystalline silicon having high reliability, thereby realizing a high-resolution display panel 10.

Since an oxide semiconductor has high carrier mobility and low leakage current, a voltage drop is not large even when driving time is long. That is, because a color change in images according to the voltage drop is not noticeable even during a low-frequency operation, the display device may operate at a low frequency. As described above, since the leakage current of the oxide semiconductor is low, at least one of the third transistor T3 and the fourth transistor T4 connected to the gate of the first transistor T1 may be used as the oxide semiconductor to prevent the leakage current from the gate of the first transistor T1 and reduce power consumption. In this case, the signal line and/or the voltage line may be added to the subpixel circuit PC of FIG. 3. In addition, transistors other than the third transistor T3 and the fourth transistor T4 may include a semiconductor layer including oxide. For example, the seventh transistor T7 may include a semiconductor layer including an oxide semiconductor.

Figure 4:
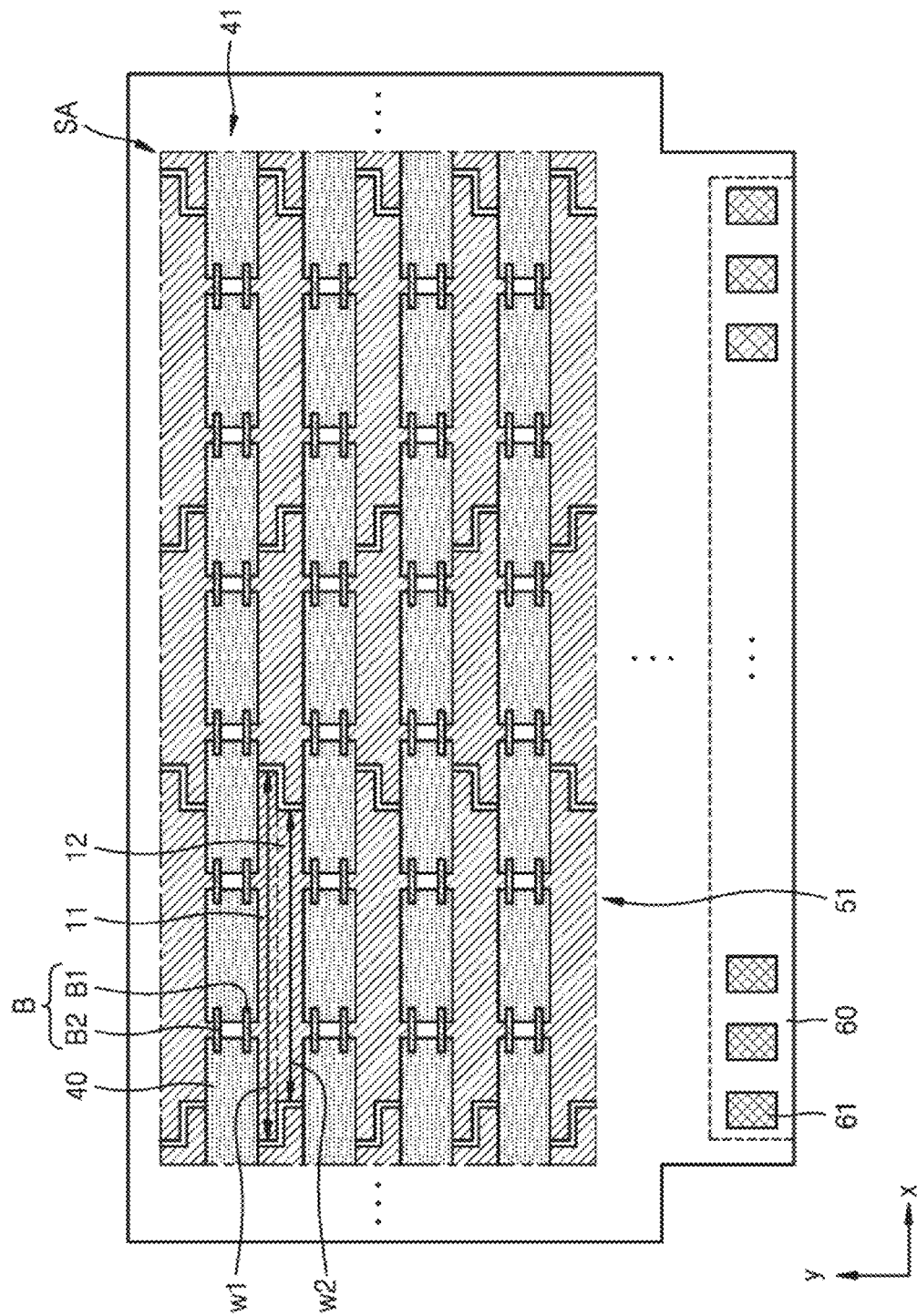
FIGS. 4, 5 and 6 each schematically illustrate a plan view of the display device including a sensing area according to an embodiment.
Figure 5:
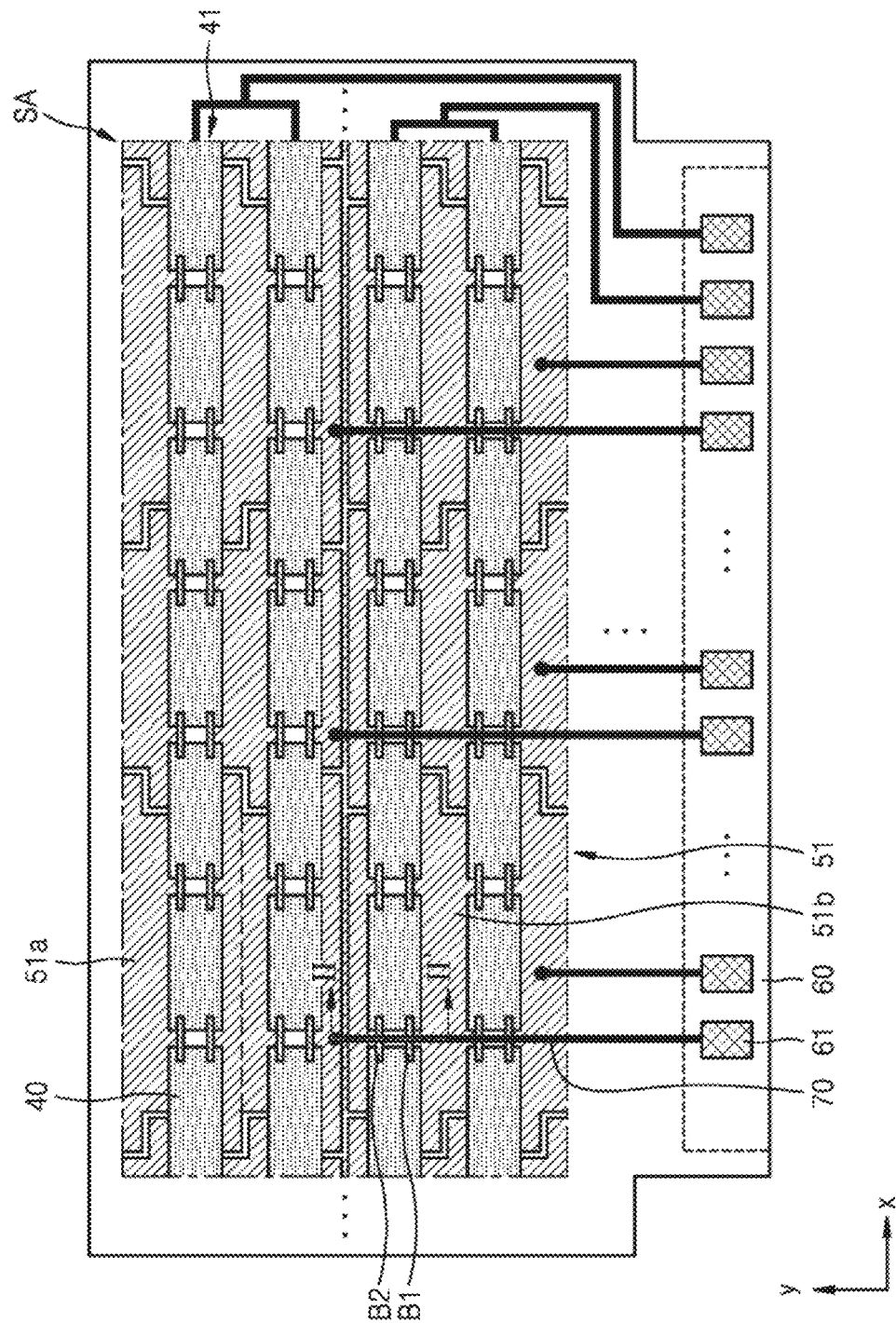

FIGS. 4 to 6 each schematically illustrate a plan view of the display device including a sensing area according to an embodiment.

Referring to FIG. 4, a first conductive layer 430 (refer to FIG. 2) and a second conductive layer 450 (refer to FIG. 2) of the touch sensor layer 400 (refer to FIG. 2) may be arranged in a sensing area SA, wherein the sensing area SA detects an input or touch from the outside. The sensing area SA may overlap the display area DA (refer to FIG. 1). The sensing area SA may include the plurality of first sensor electrodes 40 and first sensor electrode rows 41 extending in the first direction x. The first sensor electrode row 41 may include the plurality of first sensor electrodes 40 arranged in the first direction (for example, the x or -x direction). The plurality of first sensor electrode rows 41 may be spaced apart from each other in the second direction (for example, the y or -y direction). In other words, the plurality of first sensor electrode rows 41 may be arranged in the second direction (for example, the y or -y direction).

In an embodiment, the plurality of second sensor electrode rows 51 extending in the second direction (for example, the y or −y direction) may be arranged in the sensing area SA. The second sensor electrode rows 51 may extend along the second direction (for example, the y or −y direction). The plurality of second sensor electrode rows 51 may be arranged in the first direction (for example, the x or −x direction).

The first sensor electrode row 41 may include a plurality of first sensor electrodes 40. The plurality of first sensor electrodes 40 may be connected to each other through a bridge line B. The bridge line B may include a first bridge line B1 and a second bridge line B2. However, the disclosure is not limited thereto. The plurality of first sensor electrodes 40 may be connected to each other through a single bridge line B.

In an embodiment, the width of the second sensor electrode row 51 in the first direction may not be constant. In an embodiment, at least a portion of the second sensor electrode row 51 disposed between adjacent first sensor electrode rows 41 may include a first portion 11 and a second portion 12. A width w1 in the first direction (for example, the x direction or the −x direction) of the first portion 11 may be greater than a width w2 in the first direction (for example, the x direction or the −x direction) of the second portion 12. In the second sensor electrode row 51, the first portion 11 and the second portion 12 may be alternately arranged in the second direction (for example, the y direction or the −y direction). In other words, the second sensor electrode row 51 may include a plurality of first portions 11 and second portions 12 that are alternately arranged along the second direction y.

Although FIG. 4 does not illustrate that the first sensor electrode row and the second sensor electrode row 51 is connected to the pad 61, the first sensor electrode row 41 and the second sensor electrode row 51 may be connected to the pad 61. The same applies to the drawings below.

Referring to FIGS. 5 and 6, the second sensor electrode row 51 may include a second-1 sensor electrode row 51a and a second-2 sensor electrode row 51b. The second-1 sensor electrode row 51a and the second-2 sensor electrode row 51b may be arranged in the second direction (for example, the y direction or the −y direction). The second-1 sensor electrode row 51a may be further spaced apart from the pad unit 60 than the second-2 sensor electrode row 51b is spaced apart from the pad unit 60. The second-1 sensor electrode row 51a and the second-2 sensor electrode row 51b may be directly connected to the pad 61.

The pad unit 60 includes a plurality of pads 61 connected to the first sensor electrode row 41 and the second sensor electrode row 51. The pad unit 60 is connected to a driving circuit such as a touch IC for driving the first sensor electrode row 41 and the second sensor electrode row 51. Through the pad unit 60, various signals for the driving the first sensor electrode row 41 and the second sensor electrode row 51 are transmitted and received.

The second sensor electrode row 51 may include a second-1 sensor electrode row 51a which is directly connected to the pad 61 and a second-2 sensor electrode row 51b which is directly connected to the pad 61 and disposed closer to the pad 61 than the second-1 sensor electrode row 51a. Accordingly, a signal delay applied to the econd-1 sensor electrode row 51a may be reduced when the second-1 sensor electrode row 51a receives a signal from the pad 61. However, the disclosure is not limited thereto. The second sensor electrode row 51 may include three or more sensor electrodes.

The second-1 sensor electrode row 51a and the second-2 sensor electrode row 51b may be connected to the same pad 61 arranged in the pad unit 60. The second-1 sensor electrode row 51a and the second-2 sensor electrode row 51b may be connected to the same pad 61, and, at the same time, may be connected to each other through a switching transistor. In addition, the second-1 sensor electrode row 51a and the second-2 sensor electrode row 51b may be respectively connected to different pads arranged in the pad unit 60. However, the disclosure is not limited thereto.

The first sensor electrode rows 41 disposed adjacent to each other may be connected to each other through a connector and the connector may be connected to the pad 61 of the pad unit 60. However, the disclosure is not limited thereto. The first sensor electrode rows 41 adjacent to each other may each be individually connected to the pad 61.

Figure 7:
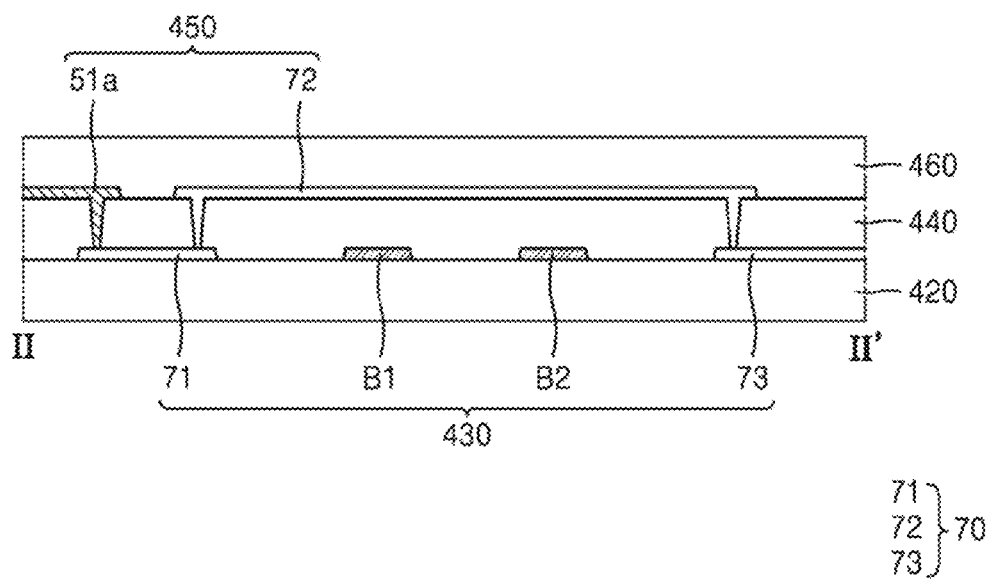
FIGS. 7 and 8 each schematically illustrate a cross-sectional view of a display device taken along line II-II' of FIG. 5, according to an embodiment.
Figure 8:
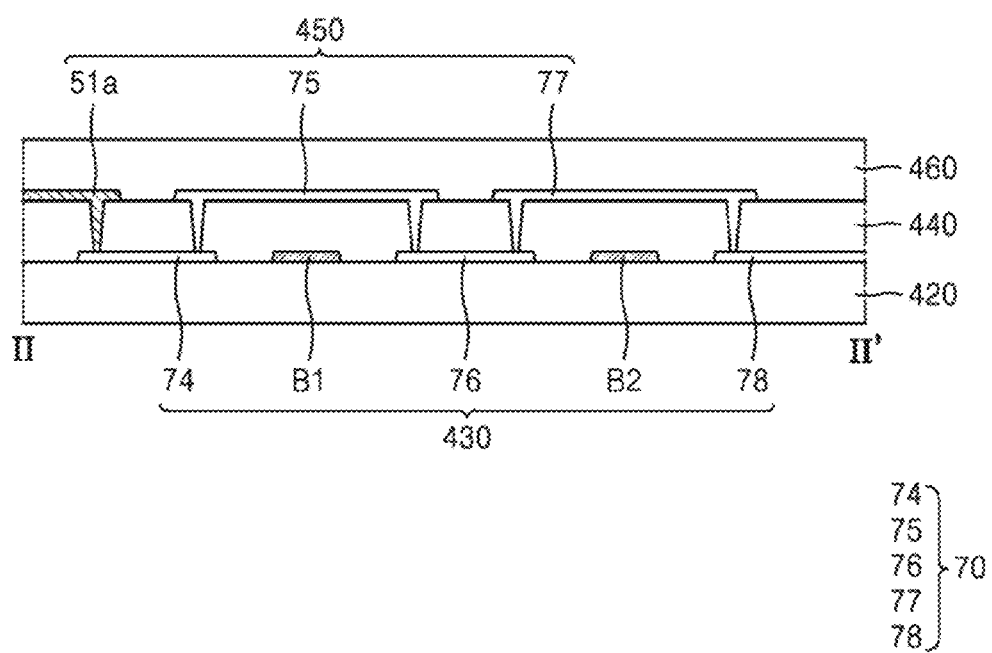

FIGS. 7 and 8 each schematically illustrate a cross-sectional view of a display device taken along line II-II' of FIG. 5 according to an embodiment.

First, according to the illustration of FIG. 5, the second-1 sensor electrode row 51a may be connected to the pad 61 of the pad unit 60 through a channel line 70. The channel line 70 connected to the second-1 sensor electrode row 51a may cross the bridge lines B connecting the plurality of first sensor electrodes 40 arranged between the second-1 sensor electrode row 51a and the pad unit 60

Referring to FIGS. 7 and 8, the first sensor electrode 40 in the first sensor electrode row 41, and the second sensor electrode row 51 may be arranged in the second conductive layer 450. The first bridge line B1 and the second bridge line B2 may be arranged in a different layer from the first sensor electrode 40 in the first sensor electrode row 41, and the second sensor electrode row 51. Particularly, the first bridge line B1 and the second bridge line B2 may be arranged in the first conductive layer 430. A portion of the channel line 70 crossing the first bridge line B1 and the second bridge line B2 may be arranged in the second conductive layer 450 different from the first conductive layer 430 in which the first bridge line B1 and the second bridge line B2 are arranged.

In an embodiment, as shown in FIG. 7, the channel line 70 may include a first channel line 71, a second channel line 72, and a third channel line 73. The first channel line 71 and the third channel line 73 may be arranged in the first conductive layer 430. The second channel line 72 of the channel line 70 crossing the first bridge line B1 and the second bridge line B2 may be arranged in the second conductive layer 450 different from the first conductive layer 430 in which the first bridge line B1 and the second bridge line B2 are arranged.

In an embodiment, as shown in FIG. 8, the channel line 70 may include a fourth channel line 74, a fifth channel line 75, a sixth channel line 76, a seventh channel line 77, and an eighth channel line 78. The fourth channel line 74, the sixth channel line 76, and the eighth channel line 78 may be arranged in the first conductive layer 430. Among the channel lines 70, the fifth channel line 75 and the seventh channel line 77 crossing the first bridge line B1 and the second bridge line B2 may be arranged in the second conductive layer 450.

Figure 9:
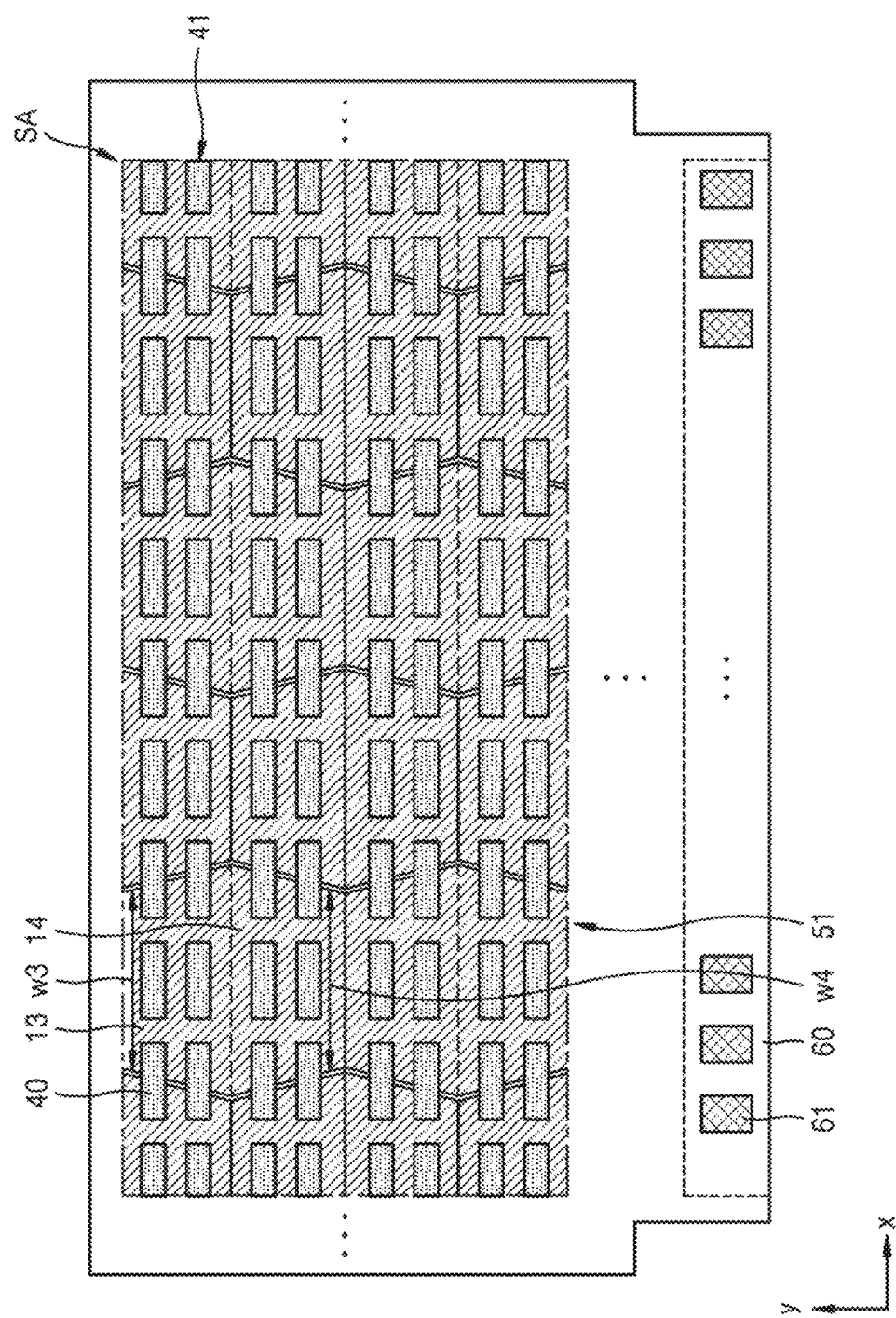
FIGS. 9, 10 and 11 each schematically illustrate a plan view of the display device including a sensing area according to an embodiment.
Figure 10:
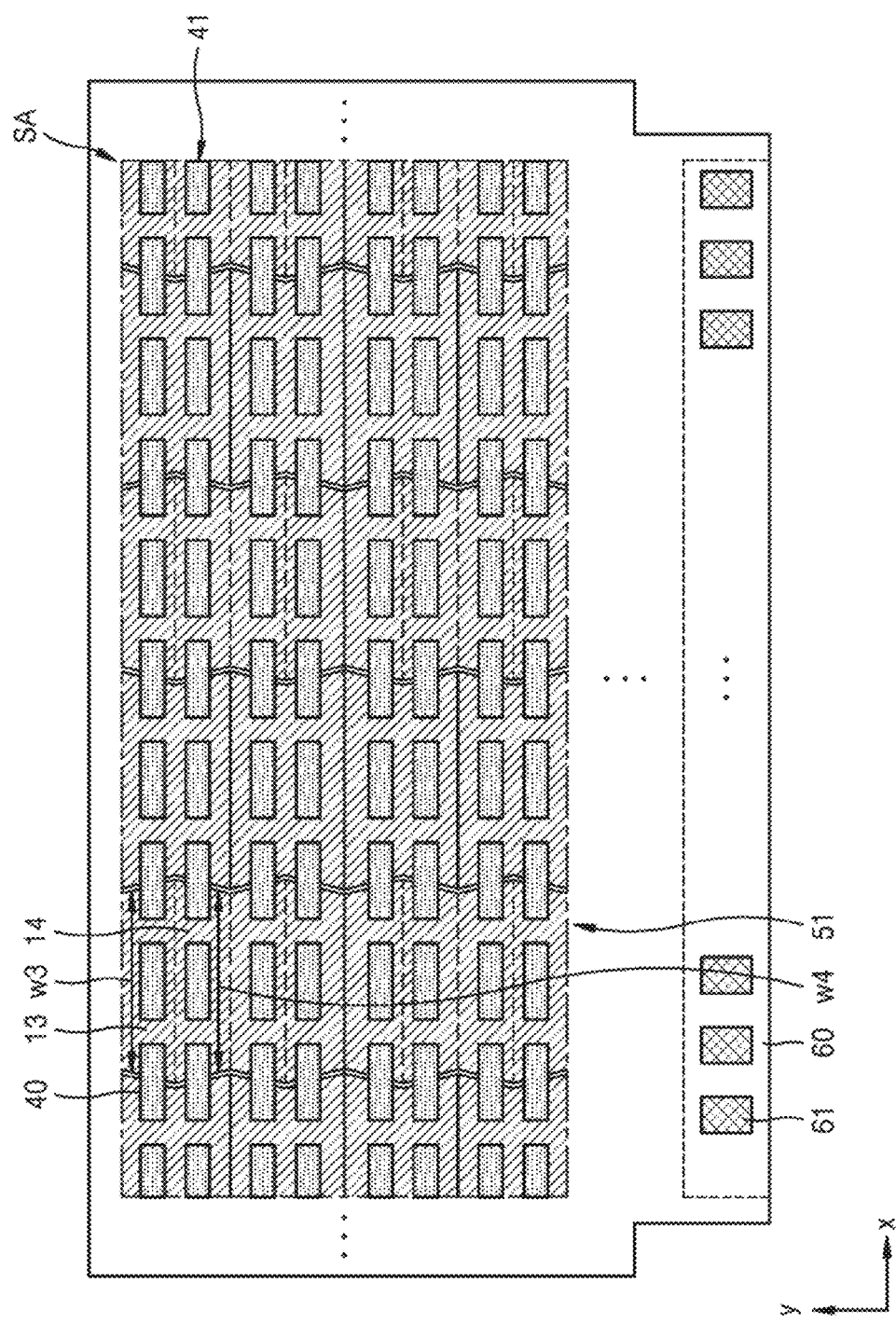
Figure 11:
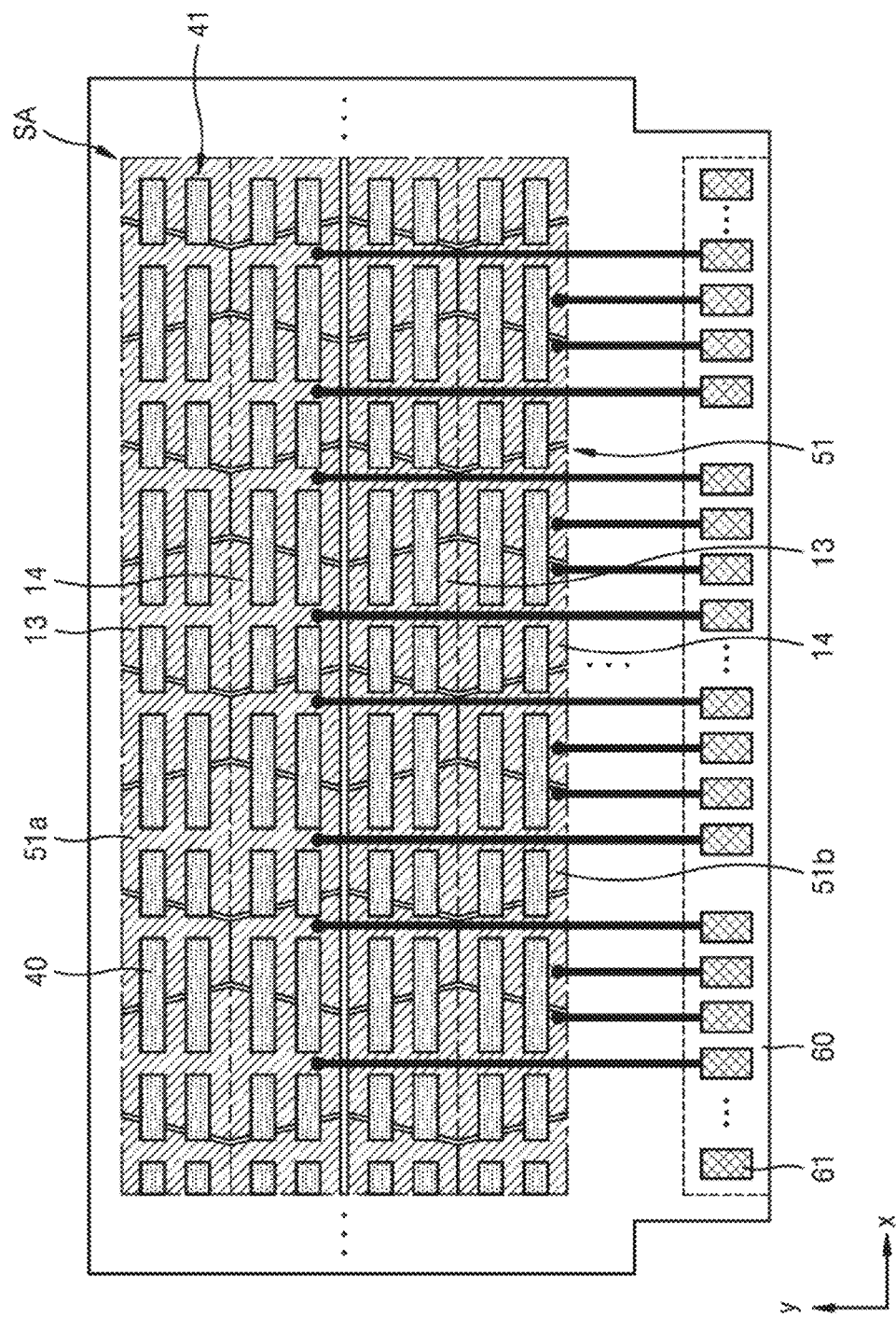

FIGS. 9 to 11 each schematically illustrate a plan view of the display device including a sensing area according to an embodiment.

Referring to FIGS. 9 and 10, the second sensor electrode row 51 may include the third portion 13 and the fourth portion 14. As shown in FIG. 9, the third portion 13 and the fourth portion 14 may be disposed in an area corresponding to two adjacent first sensor electrode rows 41. However, the disclosure is not limited thereto. As shown in FIG. 10, the third portion 13 and the fourth portion 14 may be disposed in an area corresponding to a single first sensor electrode row 41.

A width w3 of the third portion 13 in the first direction (for example, the x direction or −x direction) may constantly increase toward the pad unit 60. A width w4 of the fourth portion 14 in the first direction (for example, the x direction or −x direction) may constantly decrease toward the pad unit 60. However, the disclosure is not limited thereto.

The third portion 13 and the fourth portion 14 may be alternately arranged in the second direction (for example, the y direction or the −y direction). The second sensor electrode row 51 may include a plurality of third portions 13 and fourth portions 14 that are alternately arranged.

Referring to FIG. 11, the second sensor electrode row 51 may include a second-1 sensor electrode row 51a and a second-2 sensor electrode row 51b. The second-2 sensor electrode row 51b may be disposed closer to the pad unit 60 than the second-1 sensor electrode row 51a. Each of the second-1 sensor electrode row 51a and the second-2 sensor electrode row 51b may include the third portion 13 and the fourth portion 14 that are alternately arranged.

The second sensor electrode row 51 may be separated into a second-1 sensor electrode row 51a and a second-2 sensor electrode row 51b such that the second-1 sensor electrode row 51a is directly connected to the pad 61 through a wire and is spaced further apart from the pad unit 61 than the second-2 sensor electrode row 51b is spaced apart from the pad 61 unit. Accordingly, a signal delay applied to the second-1 sensor electrode row 51a may be reduced when the second-1 sensor electrode row 51a receives a signal from the pad 61. However, the disclosure is not limited thereto. The second sensor electrode row 51 may include three or more sensor electrode rows.

Each of the second-1 sensor electrode row 51a and the second-2 sensor electrode row 51b may be connected to a same pad 61 arranged in the pad unit 60. The second-1 sensor electrode row 51a and the second-2 sensor electrode row 51b may be connected to the same pad 61, and, at the same time, may be connected to each other through a switching transistor. In addition, the second-1 sensor electrode row 51a and the second-2 sensor electrode row 51b may be respectively connected to different pads arranged in the pad unit 60. However, the disclosure is not limited thereto.

Figure 12:
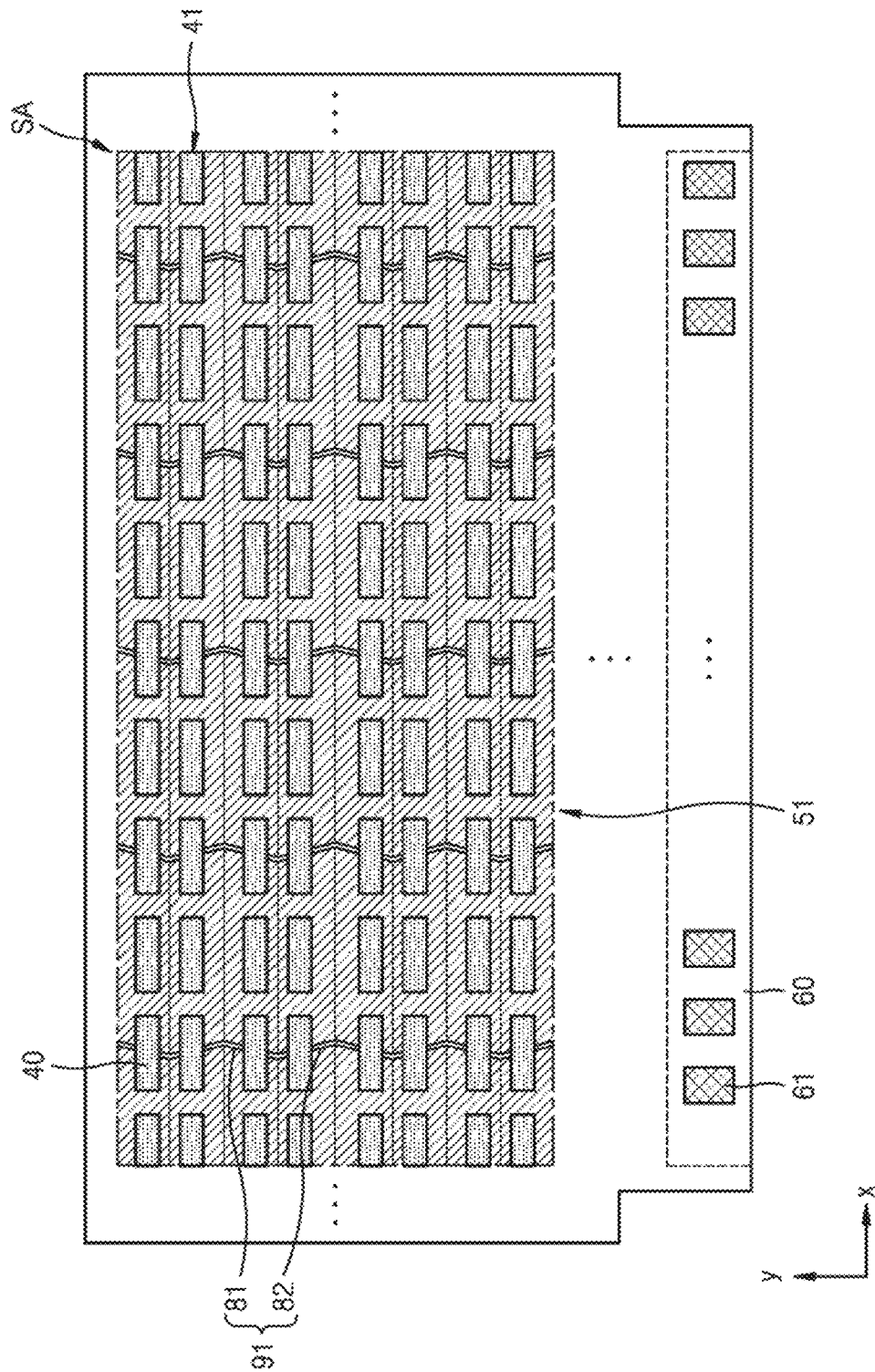
FIGS. 12, 13 and 14 each schematically illustrate a plan view of the display device including a sensing area according to an embodiment.
Figure 13:
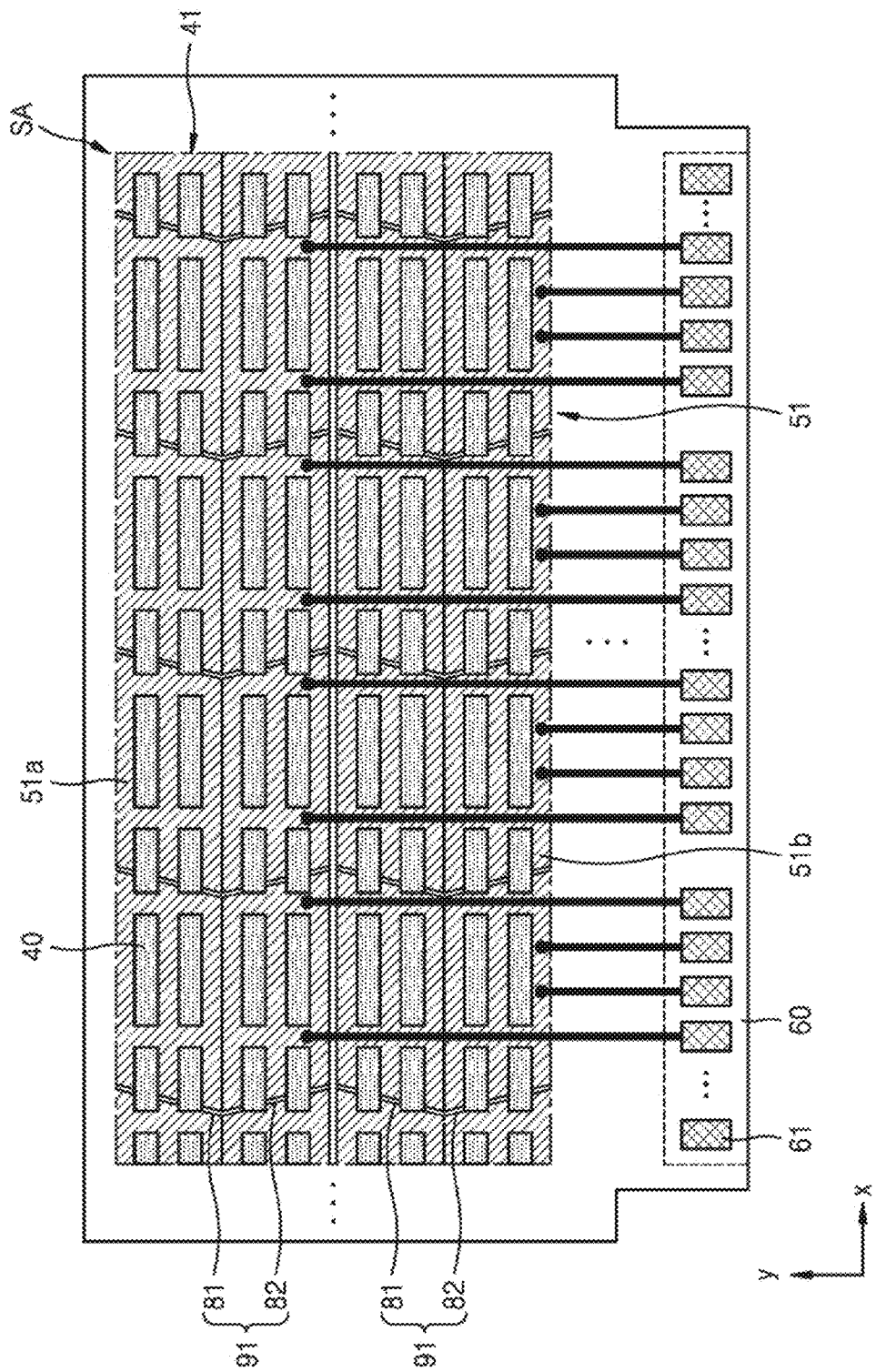
Figure 14:
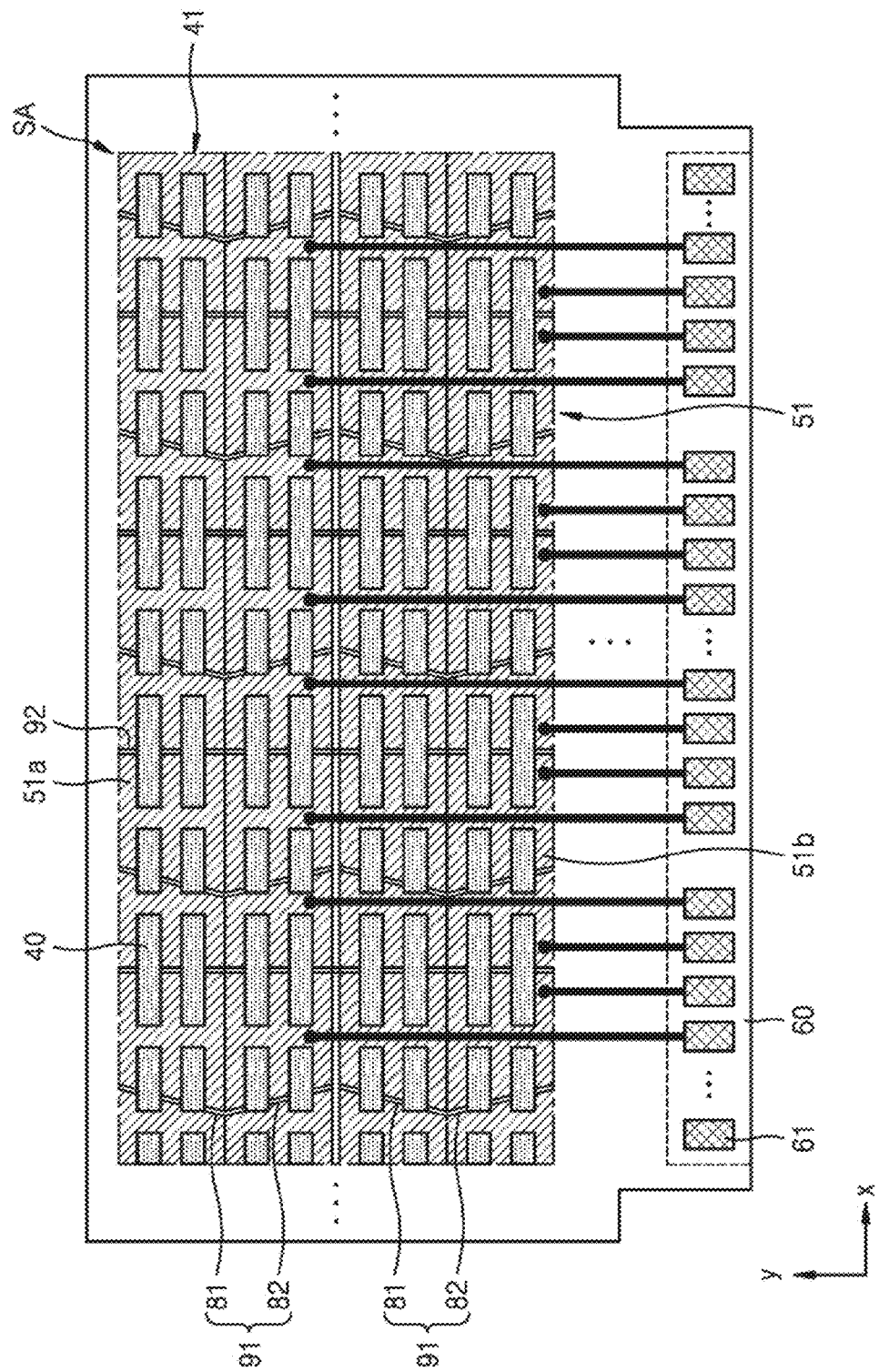

FIGS. 12 to 14 each schematically illustrate a plan view of the display device including a sensing area according to an embodiment.

Referring to FIGS. 12 and 13, a first edge 91 forming the shape of the second sensor electrode row 51 may extend in the second direction (for example, the y direction or the −y direction). The first edge 91 may include a first boundary line 81 and a second boundary 82. As illustrated in FIG. 12, the first boundary line 81 and the second boundary line 82 may each cross one first sensor electrode row 41. However, the disclosure is not limited thereto. As illustrated in FIG. 13, the first boundary line 81 and the second boundary line 82 may respectively cross two adjacent first sensor electrode rows 41.

The first boundary line 81 included in the first edge 91 may be a diagonal line having a positive inclination. In addition, the second boundary line 82 may be a diagonal line having a negative inclination. However, the disclosure is not limited thereto.

The first boundary line 81 and the second boundary line 82 may be alternately arranged in the second direction (for example, the y direction or the −y direction). The first edge 91 extending in the second direction (for example, the y direction or the −y direction) of the second sensor electrode row 51 may include a plurality of first boundary lines 81 and second boundary lines 82, which are alternately arranged.

As illustrated in FIG. 13, the second sensor electrode row 51 may include the second-1 sensor electrode row 51a and the second-2 sensor electrode row 51b. The second-2 sensor electrode row 51b may be disposed closer to the pad unit 60 than the second-1 sensor electrode row 51a. The first edge 91 of the second-1 sensor electrode row 51a and the second-2 sensor electrode row 51b may include the first boundary line 81 and the second boundary line 82, which are alternately arranged.

The second sensor electrode row 51 may include a second-1 sensor electrode row 51a and a second-2 sensor electrode row 51b such that the second-1 sensor electrode row 51a is directly connected to the pad 61 through a wire. Accordingly, a signal delay applied to the second-1 sensor electrode row 51a may be reduced when the second-1 sensor electrode row 51a receives a signal from the pad 61. However, the disclosure is not limited thereto. The second sensor electrode row 51 may include three or more sensor electrodes.

Each of the second-1 sensor electrode row 51a and the second-2 sensor electrode row 51b may be connected to a same pad 61 arranged in the pad unit 60. The second-1 sensor electrode row 51a and the second-2 sensor electrode row 51b may be connected to the same pad 61, and, at the same time, may be connected to each other through a switching transistor. In addition, the second-1 sensor electrode row 51a and the second-2 sensor electrode row 51b may be respectively connected to different pads 61 arranged in the pad unit 60. However, the disclosure is not limited thereto.

Referring to FIG. 14, the second edge 92 arranged in the other side of the first edge 91 of the second sensor electrode row 51 and extending in the second direction (for example, the y direction or the −y direction) may be a straight line. In addition, the second sensor electrode row 51 may include the second-1 sensor electrode row 51a and the second-2 sensor electrode row 51b. However, the disclosure is not limited thereto. The second sensor electrode row 51 may include three or more sensor electrode rows.

When the second sensor electrode row 51 includes the second-1 sensor electrode row 51a and the second-2 sensor electrode row 51b, each of the second-1 sensor electrode row 51a and the second-2 sensor electrode row 51b may include the first edge 91 including the first boundary line 81 and the second boundary line 82 and the second edge 92 provided in a straight line.

Figure 15:
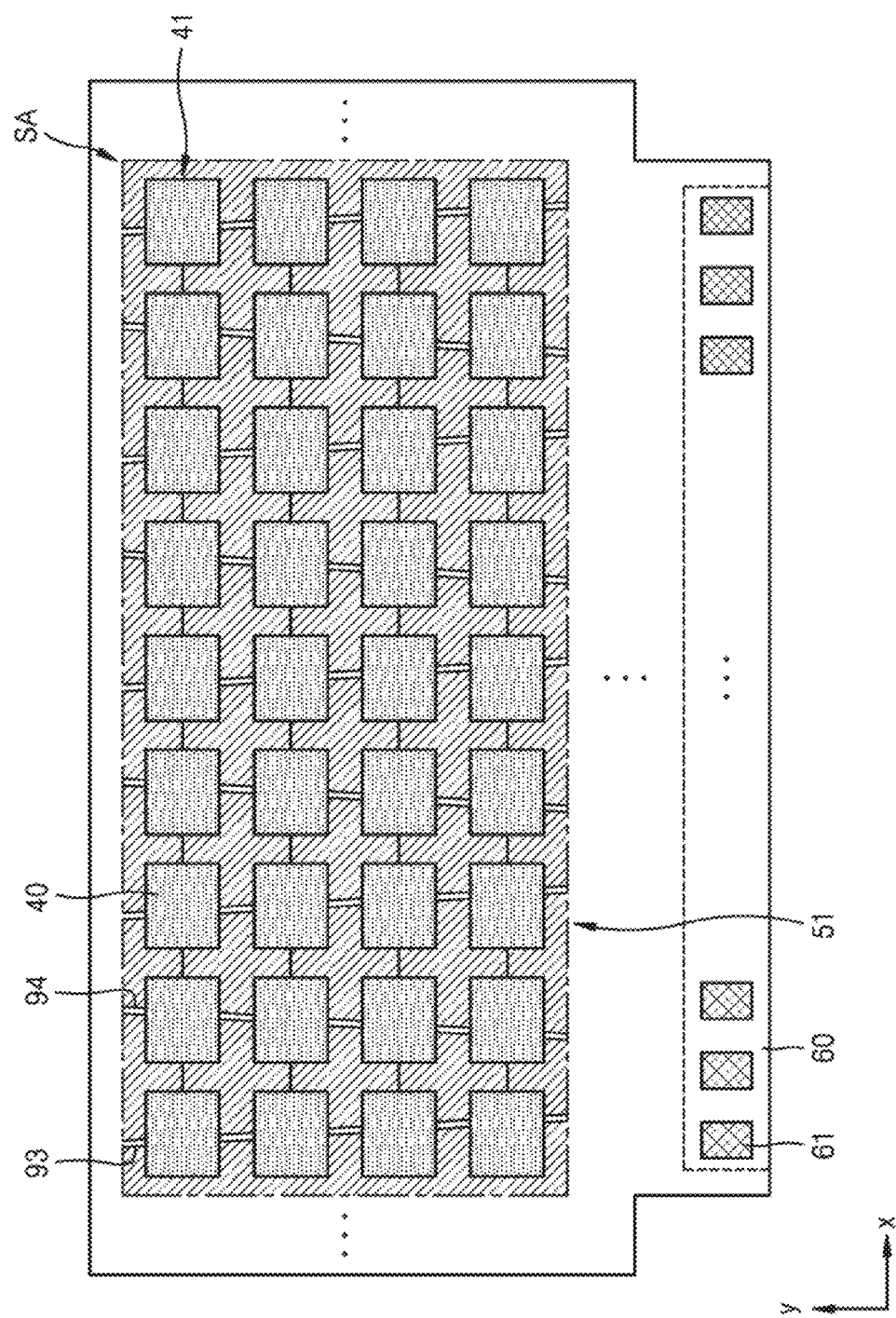
FIGS. 15 and 16 each schematically illustrate a plan view of the display device including a sensing area according to an embodiment.
Figure 16:
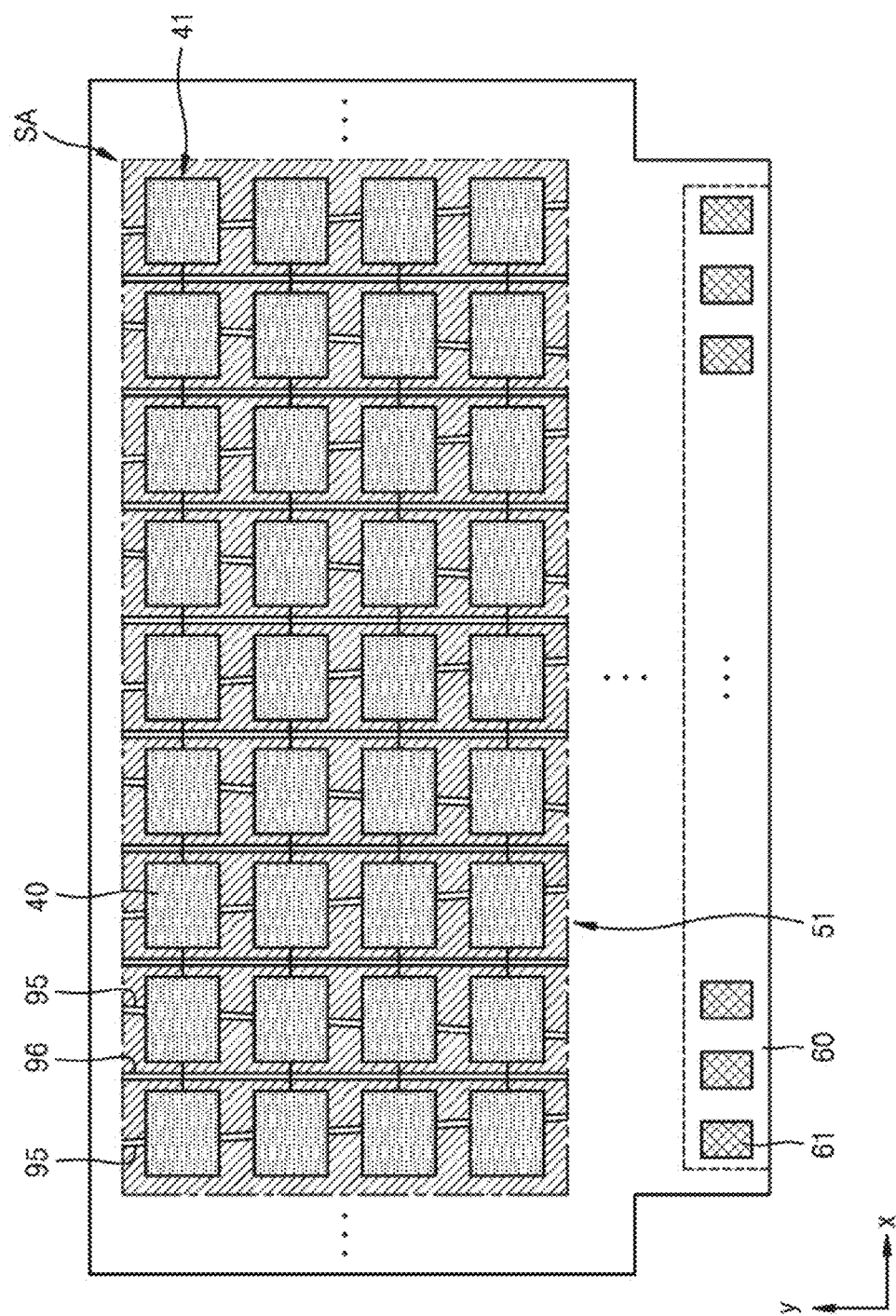

FIGS. 15 and 16 each schematically illustrate a plan view of the display device including a sensing area according to an embodiment.

Referring to FIG. 15, a third edge 93 of the second sensor electrode row 51 and extending in the second direction (for example, the y direction or the −y direction) may be a diagonal line having a positive inclination. A fourth edge 94 opposing the third edge 93 and extending in the second direction (for example, the y direction or the −y direction) may be a diagonal line having a positive inclination. The third edge 93 and the fourth edge 94 may be alternately arranged in the first direction (for example, the x direction or the −x direction).

Referring to FIG. 16, a fifth edge 95 of the second sensor electrode row 51 and extending in the second direction (for example, the y direction or the −y direction) may be a diagonal line having a positive or negative inclination. A sixth edge 96 arranged on the other side of the fifth edge 95 and extending in the second direction (for example, the y direction or the −y direction) may be a straight line.

In an embodiment, the first sensor electrode row 41 may include the plurality of first sensor electrodes 40 and may extend in the first direction (for example, the x direction or the −x direction), and the second sensor electrode row 51 may extend in the second direction (for example, the y direction or the −y direction). The second sensor electrode row 51 may extend in the second direction (for example, the y direction or the −y direction) and may form various shapes of boundaries with adjacent second sensor electrode rows. In other words, the second sensor electrode row 51 may extend in the second direction (for example, the y direction or the −y direction) and may be formed in various shapes.

Particularly, the width of the second sensor electrode row 51 in the first direction (for example, the x direction or −x direction) may not be constant. For example, the second sensor electrode row 51 may include the first portion 11 and the second portion 12 that have different widths or may include the third portion 13 and the fourth portion 14 that have widths that are constantly increased or reduced. In addition, the edge of the second sensor electrode row 51 may be a diagonal line having a positive or negative inclination angle or may be a straight line.

In some embodiments, when the touch sensor layer 400 includes the first sensor electrode row 41 extends in the first direction (for example, the x direction or −x direction) and the second sensor electrode row 51 extends in the second direction (for example, the y direction or the −y direction) and has various shapes, a capacitor between the first sensor electrode row 41 and the pen may remain constant and the capacitor between the second sensor electrode row 51 and the pen may slightly change in response to the pen moving from a left side to a right side. Accordingly, the location or inclination of the pen may be easily determined and the input or touch of the pen may be effectively detected, thereby improving the reliability and quality of a touch sensor of the display device.

According to the embodiments described above, the display device with improved reliability and quality may be implemented. However, the scope of the disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:
    a first sensor electrode row including a plurality of first sensor electrodes and extending in a first direction in a sensing area; and
    a second sensor electrode row extending in a second direction in the sensing area,
    wherein a width of the second sensor electrode row in the first direction is not constant,
    wherein a first edge of the second sensor electrode row comprises a first boundary line and a second boundary line, and
    wherein each of the first boundary line and the second boundary line crosses the first sensor electrode row.

2. The display device of claim 1, wherein the first sensor electrodes disposed adjacent to each other are connected to each other through a bridge line.

3. The display device of claim 2, wherein the second sensor electrode row includes a second-1 sensor electrode row and a second-2 sensor electrode row more adjacent to a pad unit than the second-1 sensor electrode row.

4. The display device of claim 3, wherein a portion of a channel line connecting the second-1 sensor electrode row to a pad crosses the bridge line and is arranged in a different layer from the bridge line.

5. The display device of claim 3, wherein the second-1 sensor electrode row and the second-2 sensor electrode row are connected to a same pad arranged in the pad unit.

6. The display device of claim 3, wherein the second-1 sensor electrode row and the second-2 sensor electrode row are respectively connected to different pads arranged in the pad unit.

7. The display device of claim 1, wherein at least a portion of the second sensor electrode row arranged between two first sensor electrode rows includes a first portion and a second portion, and
    wherein a width of the first portion in the first direction is greater than a width of the second portion in the first direction.

8. The display device of claim 1, wherein the second sensor electrode row includes a third portion and a fourth portion, and
    wherein each of the third portion and the fourth portion is disposed in an area corresponding to one first sensor electrode row or two first sensor electrode rows.

9. The display device of claim 8, wherein a width of the third portion in the first direction constantly increases toward a pad unit.

10. The display device of claim 9, wherein a width of the fourth portion in the first direction constantly reduces toward the pad unit.

11. The display device of claim 10, wherein the third portion and the fourth portion are alternately arranged in the second direction, and
    wherein the second sensor electrode row comprises a plurality of third portions and a plurality of fourth portions arranged alternately.

12. The display device of claim 10, wherein the second sensor electrode row comprises a second-1 sensor electrode row and a second-2 sensor electrode row disposed closer to a pad unit than the second-1 sensor electrode row, and
    wherein each of the second-1 sensor electrode row and the second-2 sensor electrode row comprises the third portion and the fourth portion arranged alternately.

13. A display device comprising:
    a first sensor electrode row including a plurality of first sensor electrodes and extending in a first direction in a sensing area; and
    a second sensor electrode row extending in a second direction in the sensing area,
    wherein a first edge of the second sensor electrode row comprises a first boundary line and a second boundary line, and
    wherein the first boundary line is a diagonal line having a positive inclination and the second boundary line is a diagonal line having a negative inclination, and
    wherein each of the first boundary line and the second boundary line crosses the first sensor electrode row.

14. The display device of claim 13, wherein the first boundary line and the second boundary line are arranged in the second direction, and wherein the first edge of the second sensor electrode row comprises a plurality of first boundary lines and a plurality of second boundary lines arranged alternately.

15. The display device of claim 14, wherein the second sensor electrode row comprises a second-1 sensor electrode row and a second-2 sensor electrode row disposed closer to a pad unit than the second-1 sensor electrode row is adjacent to the pad unit, and wherein the first edge of the second-1 sensor electrode row and the second-2 sensor electrode row comprises the first boundary line and the second boundary line arranged alternately.

16. The display device of claim 13, wherein a second edge of the second sensor electrode row is a straight line.

17. The display device of claim 16, wherein the second sensor electrode row comprises a second-1 sensor electrode row and a second-2 sensor electrode row disposed closer to a pad unit than the second-1 sensor electrode row, and wherein each of the second-1 sensor electrode row and the second-2 sensor electrode row comprises the first edge comprising the first boundary line and the second boundary line and the second edge provided in a straight line.

18. An electronic device comprising:

a first sensor electrode row including a plurality of first sensor electrodes and extending in a first direction in a sensing area; and a second sensor electrode row extending in a second direction in the sensing area, wherein a first edge of the second sensor electrode row is a diagonal line having a positive inclination, and a second edge of the second sensor electrode row is a diagonal line having a negative inclination, and wherein a width of the second sensor electrode row constantly increases or decreases along the second direction.

19. A display device comprising:

a first sensor electrode row including a plurality of first sensor electrodes and extending in a first direction in a sensing area; and a second sensor electrode row extending in a second direction in the sensing area, wherein a first edge of the second sensor electrode row is a diagonal line having a positive or negative inclination, and a second edge of the second sensor electrode row is a straight line, and wherein a width of the second sensor electrode row constantly increases or decreases along the second direction.

* * * * *